United States Patent
Mears et al.

(10) Patent No.: US 12,061,520 B2
(45) Date of Patent: Aug. 13, 2024

(54) DATA STORAGE SYSTEM DRIVE UTILIZATION

(71) Applicant: NetApp, Inc., San Jose, CA (US)

(72) Inventors: Morgan Mears, Raleigh, NC (US); Samuel Quincy Fink, Cary, NC (US)

(73) Assignee: NetApp, Inc., San Jose, CA (US)

( * ) Notice: Subject to any disclaimer, the term of this patent is extended or adjusted under 35 U.S.C. 154(b) by 14 days.

(21) Appl. No.: 17/932,916

(22) Filed: Sep. 16, 2022

(65) Prior Publication Data
US 2024/0103969 A1 Mar. 28, 2024

(51) Int. Cl.
*G06F 11/10* (2006.01)

(52) U.S. Cl.
CPC .................... *G06F 11/1096* (2013.01)

(58) Field of Classification Search
CPC .......................... G06F 11/1076–1096
See application file for complete search history.

(56) References Cited

U.S. PATENT DOCUMENTS

| | | | | |
|---|---|---|---|---|
| 7,836,226 B2 * | 11/2010 | Flynn | | G06F 3/064 |
| | | | | 710/36 |
| 9,116,823 B2 * | 8/2015 | Fillingim | | G11C 29/52 |

OTHER PUBLICATIONS

NetApp, "StorageGRID: Smart, fast, future-proof object storage," NetApp web accessed on Apr. 18, 2022; https://www.netapp.com/data-storage/storagegrid/.
Patterson, et al., "A Case for Redundant Arrays of Inexpensive Disks (RAID)," SIGMOD '88: Proceedings of the 1988 ACM SIGMOD international conference on Management of data, Jun. 1988, pp. 109-116, https://doi.org/10.1145/50202.50214.

* cited by examiner

*Primary Examiner* — Joseph R Kudirka

(57) ABSTRACT

One or more systems, devices, computer program products, and/or computer-implemented methods provided herein to use a redundant array of disks. A system can comprise a memory that stores computer executable components, and a processor that executes the computer executable components stored in the memory, wherein the computer executable components can comprise a control component that directs, for n physical drives of a redundant array of disks (RAID) storing data for at least n logical volumes, log-structured writing of data of each logical volume of the at least n logical volumes vertically across chunks of only a single physical drive of the n physical drives, wherein the control component further directs writing of parity data at each of the physical drives, which parity data at each physical drive of the subset respectively corresponds to other ones of the physical drives of the n physical drives.

23 Claims, 13 Drawing Sheets

DATA STORAGE SYSTEM DRIVE UTILIZATION

TECHNICAL FIELD

The subject disclosure relates generally to data storage systems, and more specifically to management and use, such as drive utilization, of a redundant array of independent disks.

BACKGROUND

A redundant array of independent disks (RAID) system can electronically store data, such as multiple copies of data, in different places to protect data in the case of a drive failure. Data is distributed across plural drives of the RAID system depending on a desired level of redundancy and performance. Each drive (also herein referred to as disks) can comprise plural chunks. Error correction data, such as parity data, also can be stored at the RAID system. Error correction data can comprise calculated values that can be employed to restore data from other drives of the plural drives of a RAID system in the case of drive failure of a drive of the RAID system.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatuses, and/or computer program products can facilitate a process to manage drive utilization of a redundant array of disks (RAID) system.

In accordance with an embodiment, a system can comprise a memory that stores computer executable components, and a processor that executes the computer executable components stored in the memory, wherein the computer executable components can comprise a control component that directs, for n physical drives of a redundant array of disks (RAID) storing data for at least n logical volumes, log-structured writing of data of each logical volume of the at least n logical volumes vertically across chunks of only a single physical drive of the n physical drives, wherein the control component further directs writing of parity data at each of the physical drives, which parity data at each physical drive of the subset respectively corresponds to other ones of the physical drives of the n physical drives.

As used here, the term "vertical" can refer to striping/writing/reading at chunks within a single physical drive, while "horizontal" can refer to striping/writing/reading across chunks of two or more physical drives.

In accordance with another embodiment, a computer-implemented method can comprise directing, by a system operatively coupled to a processor, for n physical drives of a redundant array of disks (RAID) storing data for at least n logical volumes, log-structured writing of data of each logical volume of the at least n logical volumes vertically across chunks of only a single physical drive of the n physical drives, and directing, by the system, writing of parity data to at least a subset of the physical drives, which parity data at each physical drive of the subset respectively corresponds to other ones of the physical drives of the n physical drives.

In accordance with yet another embodiment, a computer program product can facilitate a process to write data to a redundant array of disks. The computer program product can comprise a computer readable storage medium having program instructions embodied therewith, the program instructions executable by a processor to cause the processor to perform operations comprising directing, by the processor, for n physical drives of a redundant array of disks (RAID) storing data for at least n logical volumes, log-structured writing of data of each logical volume of the at least n logical volumes vertically across chunks of only a single physical drive of the n physical drives, and directing, by the processor, writing of parity data at each of the physical drives, which parity data at each physical drive of the subset respectively corresponds to other ones of the physical drives of the n physical drives.

An advantage of the aforementioned systems, devices, computer program products and/or computer-implemented methods can be an ability to reduce computing power, processing power, short-term memory usage, bandwidth issues, manual labor, downtime, financial loss, and/or the like associated with a multiple drive failure of a RAID system assisted by the one or more systems, devices, computer program products and/or computer-implemented methods described herein. Further, as an element of a multi-level data protection scheme, the one or more systems, devices, computer program products and/or computer-implemented methods described herein can provide for data storage without sacrificing excessive storage to minimize the probability of a whole RAID failure.

Another advantage can be increase of available storage space and efficiency of a RAID system assisted by the one or more systems, devices, computer program products, and/or computer-implemented methods described herein. That is, as compared to existing control frameworks, a RAID system assisted by the one or more systems, devices, computer program products and/or computer-implemented methods described herein can employ less space as backup to account for drive failure, and further can provide more efficient distribution of use of system bandwidth, use of short-term memory and/or the like. In combination, these advantages can provide a fast and efficient data recall/read/retrieval system for a user entity.

DESCRIPTION OF THE DRAWINGS

FIG. 13 also illustrates a remapping table associated with the write operations of FIGS. 11 to 13.

DETAILED DESCRIPTION

Figure 1:
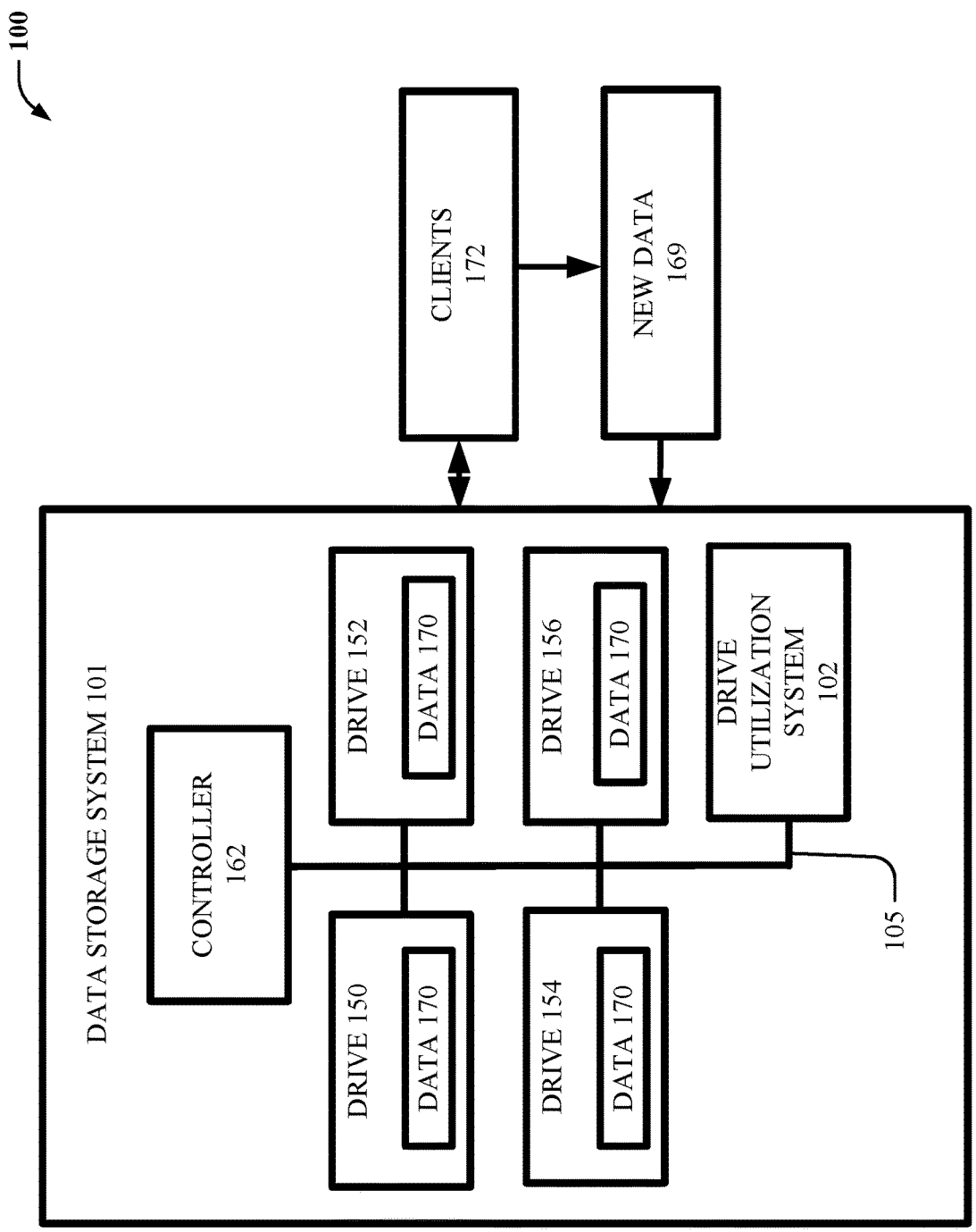
FIG. 1 illustrates a block diagram of an example, non-limiting data storage system that can facilitate a process to use a redundant array of disks, in accordance with one or more embodiments described herein.

Relative to use of a data storage system, such as a redundant array of disks (RAID) system, reduction of cost of one or more operations associated with the RAID system can be desirable. These operations can comprise recall from, storage to and/or reconstruction of data at one or more physical drives of plural physical drives of the RAID system. Each drive of the plural physical drives can comprise plural chunks. Generally, one or more virtual volumes, also referred to herein as logical volumes, can be mapped to one or more chunks of one or more physical drives of a RAID system, such as by a RAID management controller, component and/or the like.

One or more embodiments will be described herein first setting forth existing RAID frameworks and highlighting deficiencies of the existing RAID frameworks. Description then turns to one or more embodiments that can account for one or more of the deficiencies of the existing RAID frameworks.

The preceding and following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, "cost" can refer to time, money, power, storage, memory, bandwidth, manual labor and/or the like.

As used herein, "data" can comprise metadata.

As used herein, "use" can comprise access to.

As used herein, "client" or "entity" can refer to a device, network, application, virtual machine, system, machine, component, hardware, software, smart device and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200, 300 and/or 400 illustrated at FIGS. 1, 2, 3 and/or 4, and/or systems thereof, can further comprise one or more computer and/or computing-based elements described herein with reference to a computing environment, such as the computing environment 900 illustrated at FIG. 9. In one or more described embodiments, computer and/or computing-based elements can be used in connection with implementing one or more of the systems, devices, components and/or computer-implemented operations shown and/or described in connection with FIGS. 1, 2, 3 and/or 4 and/or with other figures described herein.

Figure 7:
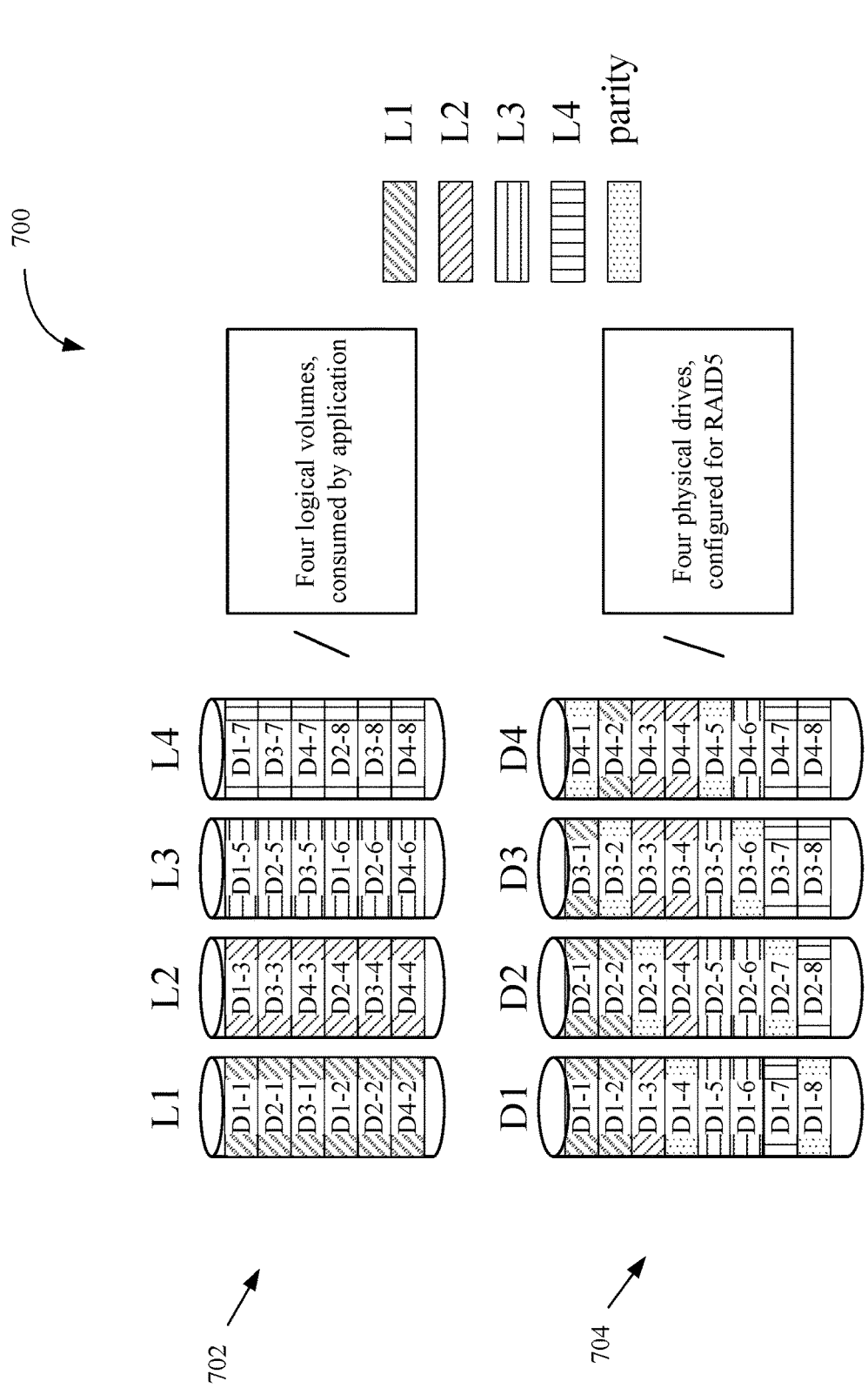
FIG. 7 depicts a block diagram of a prior art redundant array of disks.

Turning now in particular to one or more figures, and first to FIG. 7, the figure illustrates an existing RAID system 700 comprising a plurality of logical volumes 702 (L1-L4) and a plurality of physical drives 704 (D1-D4). Although four logical volumes 702 are shown, any number of volumes can correspond to the provided four physical drives 704.

Dividing a RAID5, such as illustrated at FIG. 7, into multiple volumes can be done by dividing the physical drives into horizontal contiguous sets of chunks of the physical drives 704. As shown, data from logical volume L1 can be written to and stored at each of the physical drives D1-D4. The vertical arrangement of chunks of logical volume L1 is mapped to a horizontal arrangement of chunks on physical drives D1-D4, as shown. The same can be said for logical volumes L2, L3 and L4.

One parity chunk (D1-4, D1-8, D2-3, D2-7, D3-2, D3-6, D4-1 and D4-5) is provided in each horizontal stripe of the physical drives to provide for storage of parity data (e.g., such as for calculating error correction for the physical drives). Parity can be calculated horizontally across the physical drives 704. For example, D4-1 can comprise parity data related to D1-1, D2-1 and D3-1.

In the case of failure of one drive of the physical drives 704, data can be reconstructed to a rectified (e.g., fixed, replaced, troubleshot, and/or the like) physical drive using the parity chunks. In the case that an application read hits an area of a rectified drive that has not yet been rebuilt, the read can be satisfied by calculating the requested data, as if the data were present, such as using the parity data.

In the case of failure of plural drives, the RAID5 can be considered broken. That is, the RAID5 lacks enough data and parity to reconstruct data that was on the failed plural drives. Data remaining on the non-failed drives is useless in view of being just pieces of logical volume data. That is, generally, no data of any of the logical volumes 702 can be used. This is easily seen by reviewing FIG. 7. Assume that physical drives D2 and D3 have failed. Data from each of the logical volumes L1-L4 has been lost and sufficient data does not remain to allow the lost data to be reconstructed. The only option is to recover the data from an alternate location, a backup of some sort. But this recovery requires reading the entire RAID5 array, which is a time-consuming process. To avoid this need to recover the entire RAID5, alternatives besides simple RAID5 are used, such as RAID6, RAID10, double parity and so on that handle the case of two failed drives. But each of those alternatives reduces the usable space on a given set of drives.

To address one or more of the above-mentioned deficiencies, one or more frameworks are described herein that can manage writing and reading of data to/at drives of a RAID system, provide for reduced downtime in the case of one or even plural drive failures of the RAID system, and/or provide for additional usable storage space (e.g., usable for initial storage as opposed to backup or redundant storage).

A framework described herein can manage the writing of data to one or more drives of a RAID system. The framework further can manage mapping of correspondence of the data that is stored at the one or more drives of the RAID system and of the one or more logical volumes that are mapped to the one or more drives of the RAID system. In one or more embodiments, the framework further can execute the writing of the data and/or journaling of the data.

More particularly, the framework can employ a unique approach to directing writing and to tracking of data to the plural drives to thereby provide for efficient and/or economical use of storage space of the drives. As compared to conventional RAID management systems, the frameworks described herein below can increase available storage space and efficiency of a RAID system assisted by the one or more systems, devices, computer program products and/or computer-implemented methods described herein. As compared to existing RAID management systems, the frameworks discussed herein below can decrease amount of unusable logical volume data and cost of reconstruction of data of one or even plural drives, which can result from one or more failed drives.

This can be accomplished via provision of a drive utilization system (e.g., a RAID management system) that can work in conjunction with the redundant array of disks (RAID), such as in conjunction with a management component and/or controller of the RAID. The drive utilization system can obtain deterministic information (such as direction and/or instruction) for log-structured writes of plural logical volumes to the drives (e.g., physical drives) of the RAID. The drive utilization system can direct writing to the drives. The drive utilization system and/or a suitable corresponding controller of the RAID can execute the actual writing of data to the physical drive. The drive utilization system further can generate a map of actual write locations on the physical drives corresponding to addresses of the logical volumes, to be used in reads of data from the physical drives.

As will be described in greater detail below, a drive utilization system described herein can direct vertical striping (e.g., vertically writing across chunks of one or more drives) at n physical drives for at least n logical volumes, where data of each logical volume of the n logical volumes is written vertically, using log-structured writing, across chunks of only a single physical drive of the n physical drives. This can be compared to traditional (e.g., existing) horizontal striping across chunks of not one, but always plural drives.

The vertical striping can allow for the virtual volumes/ logical volumes (e.g., those storage volumes actually presented to applications, to be used for data) to be initially journaled and then subsequently mapped to correspond to individual disk drives of a RAID (e.g., the vertical striping). This can be compared to spreading the mapping across a series of disk drives (e.g., horizontal or traditional striping). The vertical striping process can facilitate a goal of proportional degradation, such as where in the event of a multi-drive failure beyond whatever the employed RAID scheme is capable of handling, only the data on the failed drives is lost. Only the data from the failed drives is to be recovered from backup or failover storage locations, not the entire RAID array. This dramatically reduces the time and cost to restore the RAID array to full operational status. The reduction can be enough that dual drive failure techniques are not needed, allow better utilization of the physical hard drives.

To account for the deterministic (e.g., default) mapping of a virtual volume to one or more drives, such as by a RAID management component or controller, journaling of the actual write relative to addresses of the logical volumes can be used, such as with log-structured writes, from which a map can be generated by the drive utilization system for subsequent reads of data from the physical drive.

The journaling can facilitate logging of what is actually written to the physical drives and any correspondence to initial deterministic allocation via the RAID. The logged/ journaled data (e.g., log-structured writes) can comprise a timestamp, logical drive starting address, size of the data, and/or the like. This feature can facilitate reduction or elimination of sacrifice of performance of the RAID and/or of write amplification, as side-effects of achieving the proportional degradation. In one or more embodiments, the actual write of the data to the physical drives can comprise the journaling. In one or more other embodiments, a journal (e.g., listing, cache, table, matrix, and/or the like) can be separate from the actual write. In such case, the journal can be written to the same physical drive as the data which is journaled at the journal.

Furthermore, the journaling can facilitate a sequential workload (e.g., as presented to physical drives) even when an actual application write workload is not sequential. A sequential workload can be desirable because it can maximize a possibility that the underlying RAID can execute writes of full stripes of the individual physical drives, and furthermore, full horizontal strips across plural physical drives.

Moreover, a mapping generation can facilitate reading of data from the physical drives, such as by mapping logical/ virtual addresses of the logical volumes to physical addresses of the physical drives. This can account for what is viewed as random writes from the perspective of the RAID engine, as compared to traditional "sequential" horizontal writes, again from the perspective of a respective RAID engine.

Use of a drive utilization system, as described herein, can reduce computing power, processing power, short-term memory usage, bandwidth issues, manual labor, downtime, financial loss and/or the like associated with a multiple drive failure of a RAID system assisted by the one or more systems, devices, computer program products and/or computer-implemented methods described herein. As an element of a multi-level data protection scheme, the one or more systems, devices, computer program products and/or computer-implemented methods described herein can reduce the cost of a data loss to a low number, low enough that the improved drive usage overcomes the data loss cost.

For example, a RAID system can be employed for objects stored on a single node in a multi-node object storage system, where protection of data also can be facilitated by hosting additional copies on other nodes, or by employing a multi-node erasure coding scheme. The framework described herein can leverage RAID for low-level, high performance, conceptually simple recoveries from statistically likely failures, such as a single drive failure, while relying on one or more other layers of a total data protection scheme for recovery from statistically less likely failures, such as two or three simultaneous drive failures of a RAID. The use of vertical striping and journaling as described herein can account for a discontinuous failure mode of a conventional RAID.

In one example, consider a storage node, not controlled/assisted/facilitated by the framework described herein, with 100 8 terabyte (TB) drives that use RAID5 to protect from single drive failures. If one drive fails, recovery can be fast and local and can result in the copying of approximately 8 TB of data. If two drives fail in a conventional RAID5 configuration, recovery would require copying approximately 800 TB of data across the network, which can be expected to take approximately 100 times as long as reconstruction of 8 TB of data, while consuming large amounts of network bandwidth. The cost differential can be such that storage efficiency is continually sacrificed to reduce RAID failures at a node level.

Differently, management/direction of a RAID scheme with a "proportional degradation" quality, as described herein, can protect against statistically likely failures, while providing a proportional cost of recovery from statistically unlikely failures. This can reduce and/or eliminate one or more barriers to storage efficiency.

Figure 6:
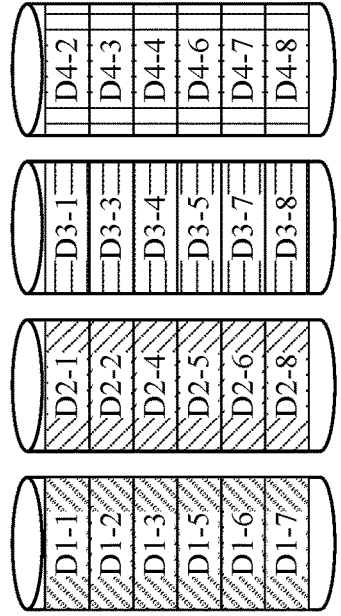
FIG. 6 depicts another block-based RAID system managed by a drive utilization system, in accordance with one or more embodiments described herein.
Figure 6:
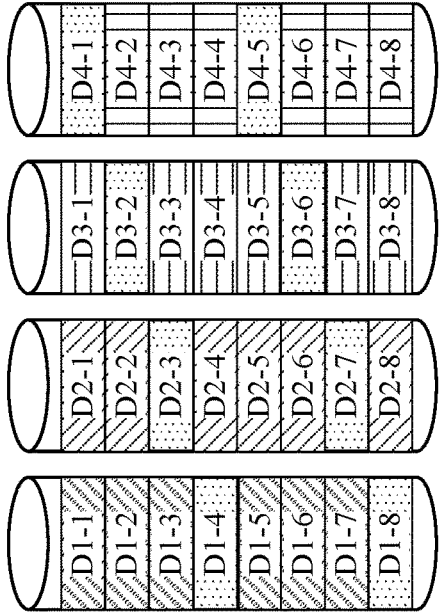

Turning next generally to FIG. 6, general function of a RAID system 600 is illustrated, as can be controlled and/or managed by a drive utilization system that will be subsequently detailed relative to FIGS. 1 to 4, and which drive utilization system can account for one or more deficiencies of existing frameworks, such as that described relative to FIG. 7.

At FIG. 6, a RAID system 600 is illustrating comprising a plurality of logical volumes 602 (LI-LIV) and a plurality of physical drives 604 (DI-DIV). At least a same number of logical volumes 602 are provided as a number of physical drives 604. Different from traditional RAID management, data from each logical volume 602 is stored at only one of the physical drives 604. Initial construction of the data at the physical drives 604 is thus facilitated by vertical writing (e.g., vertical striping) across chunks of each physical drive 604. For example, data of L1 is written at physical drive D1, and so forth. This can be seen by all of the chunks D1-1 to D1-7 of logical volume L1 being present on just physical drive D1. This is contrasted with the prior art operation as shown in FIG. 7, where the chunks from logical volume L1 are spread across physical drives D1-D4.

In one or more other embodiments, additional logical volumes can correspond to a single physical drive. For example, two logical volumes L1 can correspond to a physical drive D1, the physical drive D1 being partitioned to correspond to the relationships of the two logical volumes.

Parity chunks (D1-4, D1-8, D2-3, D2-7, D3-2, D3-6, D4-1 and D4-5) at each of the physical drives provide for storage of parity data (e.g., such as for calculating error correction for the physical drives). Parity is calculated horizontally across the physical drives 604 as is normal for RAID operation. For example, D4-1 can comprise parity data related to D1-1, D2-1 and D3-1. Put another way, each physical drive can comprise a parity chunk comprising parity data corresponding to multiple other physical drives (and thus to multiple other logical volumes), and specifically to each other physical drive of the n physical drives (and thus to each other logical volume of the n logical volumes).

In the case of failure of one drive of the physical drives 604, data can be reconstructed to a rectified (e.g., fixed, replaced, troubleshot, and/or the like) physical drive using the parity chunks, as is normal in RAID operation. In the case that an application read hits an area of a rectified drive that has not yet been rebuilt, the read can be satisfied by calculating the requested data, as if the data were present, such as using the parity data.

In the case of failure of plural drives, the RAID 600 is not considered broken. That is, because data at each logical volume is limited to correspondence to a single physical drive, data corresponding to the non-failed physical drives 604 (and thus to logical volumes 602 corresponding to those non-failed physical drives 604) still can be employed. For example, if the non-failed physical drives 604 comprise file systems, those file systems are not missing any pieces and can continue to function. In this way, reads and writes to be conducted to reconstruct the failed drives from data stored at other systems, nodes and/or the like can be proportional to the volume of actual lost/failed data of the failed plural physical drives. This is because data for each logical volume 602 does not need to be read to reconstruct the plural failed drives.

Turning next to FIG. 1, one or more embodiments of the non-limiting system 100 described herein can include one or more devices, systems, and/or apparatuses that can facilitate a process to use a redundant array of disks, such as the RAID 600 of FIG. 6, in accordance with one or more embodiments described herein.

While referring here to one or more processes, facilitations, and/or uses of the non-limiting system 100, description provided herein, both above and below, also can be relevant to one or more other non-limiting systems described herein, such as the non-limiting systems 200, 300, and/or 400, to be described below in detail.

The non-limiting system 100 can facilitate a process of data storage at plural drives (e.g., physical drives) of a node. As illustrated, the non-limiting system 100 can comprise a data storage system 101 having a plurality of drives 150, 152, 154, 156 (e.g., 150-156). The data storage system 101 can represent data storage at a single node of an overall object storage system (not shown) having plural nodes. The drives 150 to 156 can store data 170, such as data, metadata, software elements, application elements, and/or the like. In one or more embodiments, a controller 162 (e.g., a RAID controller or other management component) can facilitate the execution of this storage of the data 170 and of new data 169, and subsequent recall or reading of the data 170, 169. In one or more embodiments, the data storage system 101 (e.g., the controller 162) can be configured to move one or more aspects of data 170 over plural nodes of the larger object storage system over a life of the data at the overall object storage system.

A bus 105 can facilitate local communication between the elements of the data storage system 101.

In one or more embodiments, the data storage system 101 can comprise a drive utilization system 102. Generally, such drive utilization system 102 can facilitate both a process to direct writing to a RAID (e.g., the drives 150 to 156) and a process to direct reading from the RAID.

Figure 2:
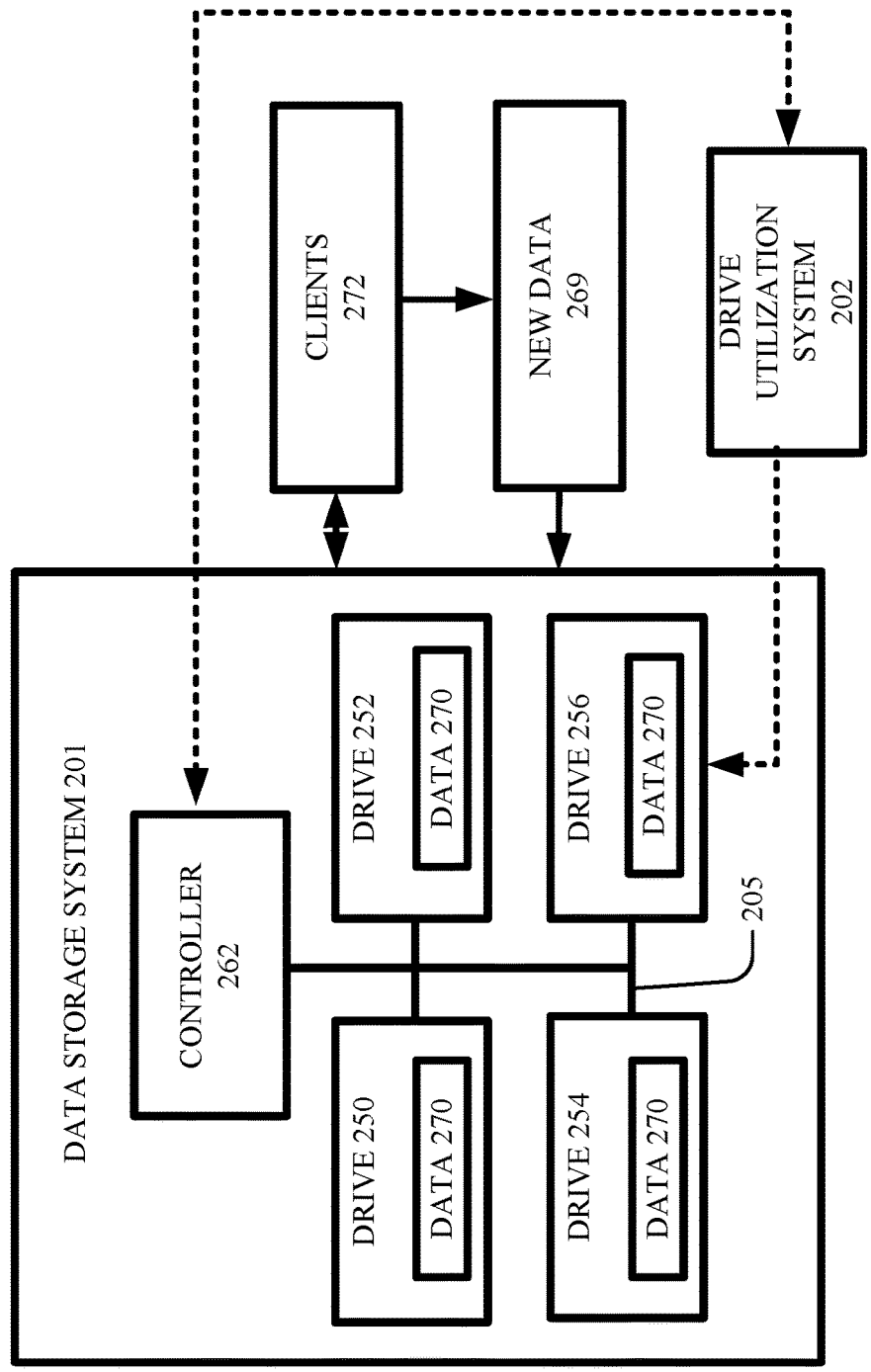
FIG. 2 illustrates a block diagram of another example, non-limiting data storage system that can facilitate a process to use a redundant array of disks, in accordance with one or more embodiments described herein.

Turning next to FIG. 2, another non-limiting system 200 is illustrated. One or more embodiments of the non-limiting system 200 described herein can include one or more devices, systems, and/or apparatuses that can facilitate a process to direct a request related to an object at an object storage system, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more other non-limiting systems described herein, such as the non-limiting systems 100, 300, and/or 400, to be described below in detail.

Like the non-limiting system 100, the non-limiting system 200 that can facilitate a process of data storage at plural drives (e.g., physical drives) of a node. As illustrated, the non-limiting system 200 can comprise a data storage system 201 having a plurality of drives 250, 252, 254, 256 (e.g., 250 to 256). The data storage system 201 can represent data storage at a single node of an overall object storage system (not shown) having plural nodes. The drives 250 to 256 can store data 270, such as data, metadata software elements, application elements, and/or the like. In one or more embodiments, a controller 262 (e.g., a RAID controller or other management component) can facilitate the execution of this storage of the data 270 and of new data 269, and subsequent recall or reading of the data 270, 269.

A bus 205 can facilitate local communication between the elements of the data storage system 201.

In one or more embodiments, the non-limiting system 200 can comprise a drive utilization system 202 that can be separate from, such as external to, the data storage system 201. As illustrated, the drive utilization system 202 can communicate either directly with one or more of the drives 250 to 256 or with the controller 262. Generally, the drive utilization system 202 can facilitate both a process to direct writing to a RAID (e.g., the drives 250 to 256) and a process to direct reading from the RAID.

Communication between the drive utilization system 202 and the data storage system 201 can be facilitated by wired and/or wireless means including, but not limited to, employing a cellular network, a wide area network (WAN) (e.g., the Internet), and/or a local area network (LAN).

Figure 3:
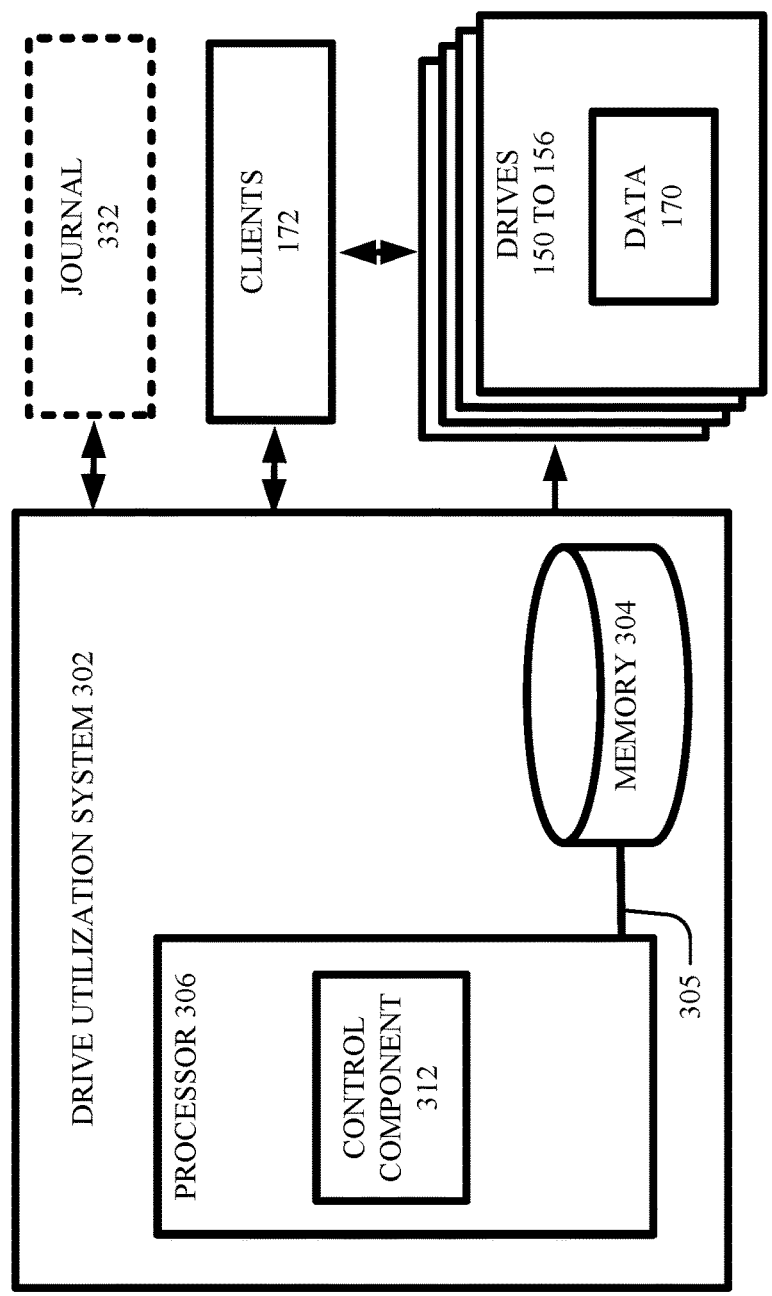
FIG. 3 illustrates a block diagram of an example, non-limiting system that can facilitate a process to use a redundant array of disks, in accordance with one or more embodiments described herein.

Referring next to FIG. 3, a non-limiting system 300 is depicted. One or more embodiments of the non-limiting system 300 described herein can include one or more devices, systems and/or apparatuses that can facilitate a process to use a redundant array of disks (RAID), in accordance with one or more embodiments described herein. Repetitive description of like elements and/or processes employed in respective embodiments is omitted for the sake of brevity. While referring here to one or more processes, facilitations, and/or uses of the non-limiting system 300, description provided herein, both above and below, also can be relevant to one or more non-limiting systems or elements of other non-limiting systems described herein, such as the non-limiting system 400, to be described below in detail, the drive utilization system 102 and/or the drive utilization system 202.

The non-limiting system 300 can comprise a drive utilization system 302 that can facilitate both a process to direct writing to a RAID (e.g., the drives 150 to 156) and a process to direct reading from the RAID. As illustrated, the drive utilization system 302 can comprise a control component 312, processor 306, memory 304 for storing programs and software to cause the operation of the drive utilization system 302, and/or bus 305.

The control component 312, and thus the drive utilization system 302, can generally access the data 170 and/or the drives 150 to 156 by employing any suitable method of communication, by wired and/or wireless means including, but not limited to, employing Serial Attached SCSI (SAS), Fibre Channel (FC), a wide area network (WAN) (e.g., the Internet), and/or a local area network (LAN). In one or more embodiments, the control component 312 can be comprised by the processor 306.

One or more aspects of a component (e.g., the control component 312) can be employed separately and/or in combination, such as employing one or more of the memory 304 or the processor 306. Additionally, and/or alternatively, the processor 306 can execute one or more program instructions to cause the processor 306 to perform one or more operations by these components.

It is noted that in one or more embodiments, the drive utilization system 302 can be separate from, and thus external to, a respective data storage system having a controller and the drives 150 to 156. In one or more other embodiments, the drive utilization system 302 can be comprised by, and thus internal to, a respective data storage system having the controller and the drives 150 to 156.

Figure 4:
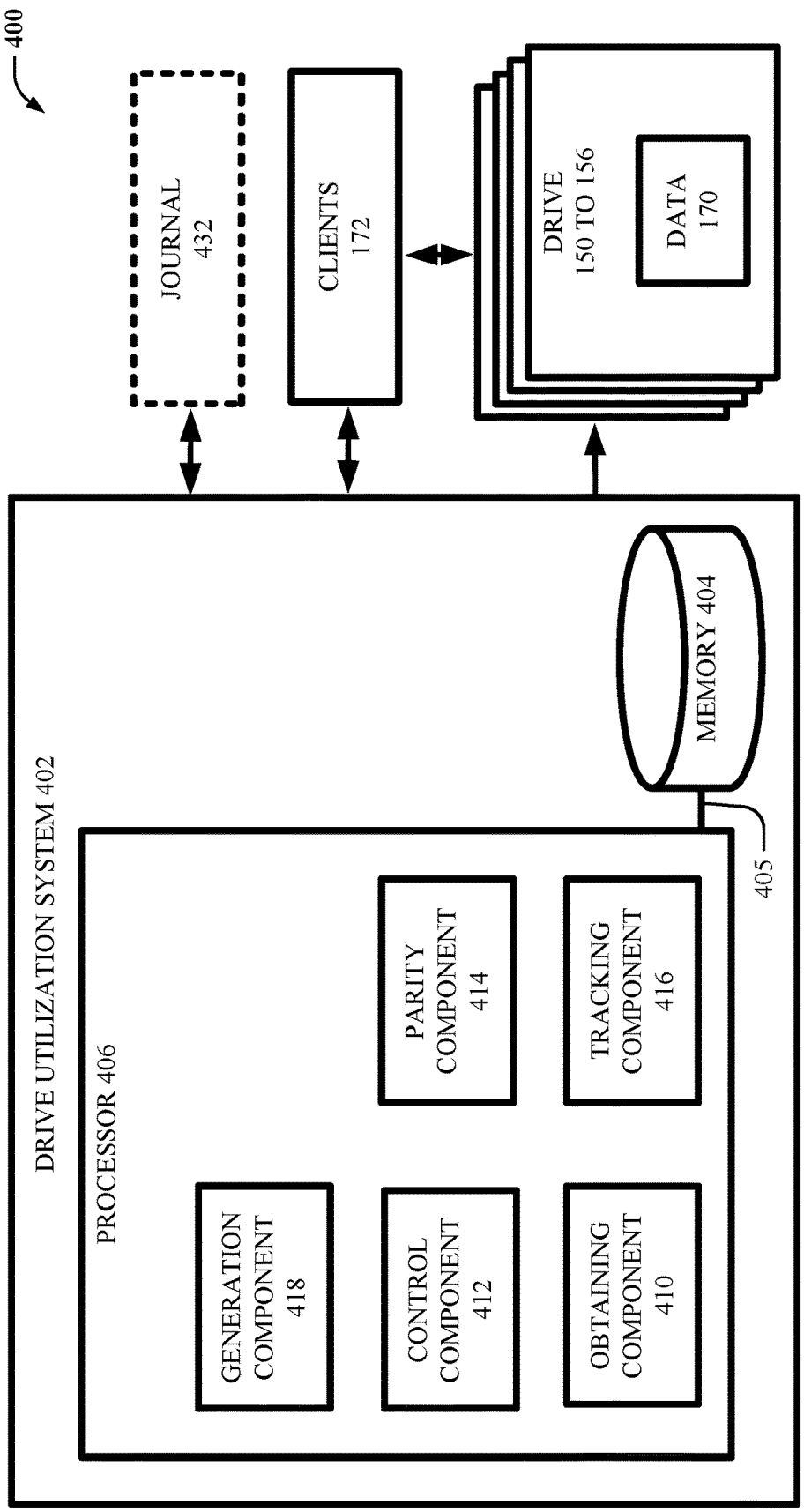
FIG. 4 illustrates a block diagram of another example, non-limiting system that can facilitate a process to use a redundant array of disks, in accordance with one or more embodiments described herein.

Turning next to FIG. 4, a non-limiting system 400 is depicted. One or more embodiments of the non-limiting system 400 described herein can include one or more devices, systems, and/or apparatuses that can facilitate a process to write data to a RAID, in accordance with one or more embodiments described herein. Repetitive description of like elements and/or processes employed in respective embodiments is omitted for the sake of brevity. While referring here to one or more processes, facilitations, and/or uses of the non-limiting system 400, description provided herein, both above and below, also can be relevant to one or more non-limiting systems or elements of other non-limiting systems described herein, such as the non-limiting system 300, the drive utilization system 102 and/or the drive utilization system 202.

The non-limiting system 400 can comprise a drive utilization system 402 that can facilitate both a process to direct writing to a RAID (e.g., the drives 150 to 156) and a process to generate log-structured writes tracking the writing to the RAID.

The drive utilization system 402, as illustrated, can comprise any suitable type of component, machine, device, facility, apparatus, and/or instrument that comprises a processor and/or can be capable of effective and/or operative communication with a wired and/or wireless network. All such embodiments are envisioned. For example, drive utilization system 402 can comprise a server device, computing device, general-purpose computer, special-purpose computer, desktop computer, and/or another suitable type of device and/or computing device. Likewise, the drive utilization system 402 can be disposed and/or run at any suitable device, such as, but not limited to a server device, computing device, general-purpose computer, special-purpose computer, desktop computer, and/or another suitable type of device and/or computing device.

The drive utilization system 402 can be associated with, such as accessible via, a cloud computing environment. For example, the drive utilization system 402 can be associated with a cloud computing environment 1002 described below with reference to illustration 1000 of FIG. 10.

Operation of the non-limiting system 400 and/or of the drive utilization system 402 is not limited to performance of a single writing, directing, journaling, reading, and/or mapping operation, and/or to such execution at a single drive of a RAID. Rather, operation of the non-limiting system 400 and/or of the drive utilization system 402 can be scalable. For example, the non-limiting system 200 and/or the drive utilization system 402 can facilitate plural operation performances of one or more of the above-listed types at least partially in parallel with one another, which can be performed relative to one or more drives of a RAID.

As illustrated the drive utilization system 402 can comprise a control component 412, parity component 414, tracking component 416, obtaining component 410, generation component 418, processor 406, memory 404 for storing programs and software to cause the operation of the drive utilization system 402 and/or bus 405.

One or more communications between one or more components of the non-limiting system 400 and/or drive utilization system 402 can be facilitated by wired and/or wireless means including, but not limited to, employing SAS, FC, a cellular network, a wide area network (WAN) (e.g., the Internet), and/or a local area network (LAN).

Discussion now turns to the processor 406, memory 404, and bus 405 of the drive utilization system 402.

For example, in one or more embodiments, drive utilization system 402 can comprise a processor 406 (e.g., computer processing unit, microprocessor, classical processor, and/or like processor). In one or more embodiments, a component associated with drive utilization system 402, as described herein with or without reference to the one or more figures of the one or more embodiments, can comprise one or more computer and/or machine readable, writable, and/or executable components and/or instructions that can be executed by processor 406 to facilitate performance of one or more processes defined by such component(s) and/or instruction(s). In one or more embodiments, the processor 406 can comprise the control component 412, parity component 414, tracking component 416, obtaining component 410, and/or generation component 418.

In one or more embodiments, the drive utilization system 402 can comprise a computer-readable memory 404 that can be operably connected to the processor 406. The memory 404 can store computer-executable instructions that, upon execution by the processor 406, can cause generation of one or more other components of the drive utilization system 402 (e.g., the control component 412, parity component 414, tracking component 416, obtaining component 410, and/or generation component 418), which can perform one or more actions. In one or more embodiments, the memory 404 can store computer-executable components (e.g., the control component 412, parity component 414, tracking component 416, obtaining component 410, and/or generation component 418).

The processor 406 and memory 404 be communicatively, electrically, operatively, optically and/or otherwise coupled to one another via a bus 405. Bus 405 can comprise one or more of a memory bus, memory controller, peripheral bus, external bus, local bus, and/or another type of bus that can employ one or more bus architectures. One or more of these examples of bus 405 can be employed to implement one or more embodiments described herein.

In one or more embodiments, drive utilization system 402 can be coupled (e.g., communicatively, electrically, operatively, optically and/or like function) to one or more external systems (e.g., a non-illustrated electrical output production system, one or more output targets, an output target controller, and/or the like), sources and/or devices (e.g., computing devices, communication devices and/or like devices), such as via a network. In one or more embodiments, one or more of the components of the drive utilization system 402 can reside in the cloud, and/or can reside locally in a local computing environment (e.g., at a specified location(s)).

It is noted that in one or more embodiments, the drive utilization system 402 can be comprised by a RAID engine. In one or more embodiments, the drive utilization system 402 can be separate from, and thus external to, a respective data storage system having a controller and the drives 150 to 156. In one or more other embodiments, the drive utilization system 402 can be comprised by, and thus internal to, a respective data storage system having the controller and the drives 150 to 156.

In addition to the processor 406 and/or memory 404 described above, drive utilization system 402 can comprise one or more computer and/or machine readable, writable, and/or executable components and/or instructions that, when executed by processor 406, can facilitate performance of one or more operations defined by such component(s) and/or instruction(s).

Turning now first to the obtaining component 410, the obtaining component 410 can locate, find, search, and/or otherwise obtain data of a data storage system. The data can be that which is to be written to the data storage system, in process of being written, and/or that which has already been written. That is, the obtaining can be performed prior to, during, and/or after the writing of the data to the data storage system, such as to one of the drives 150 to 156. The data additionally, and/or alternatively, can comprise information regarding data to be written, being written, or having been written to the data storage location, such as context data (e.g., size or other information).

Figure 5:
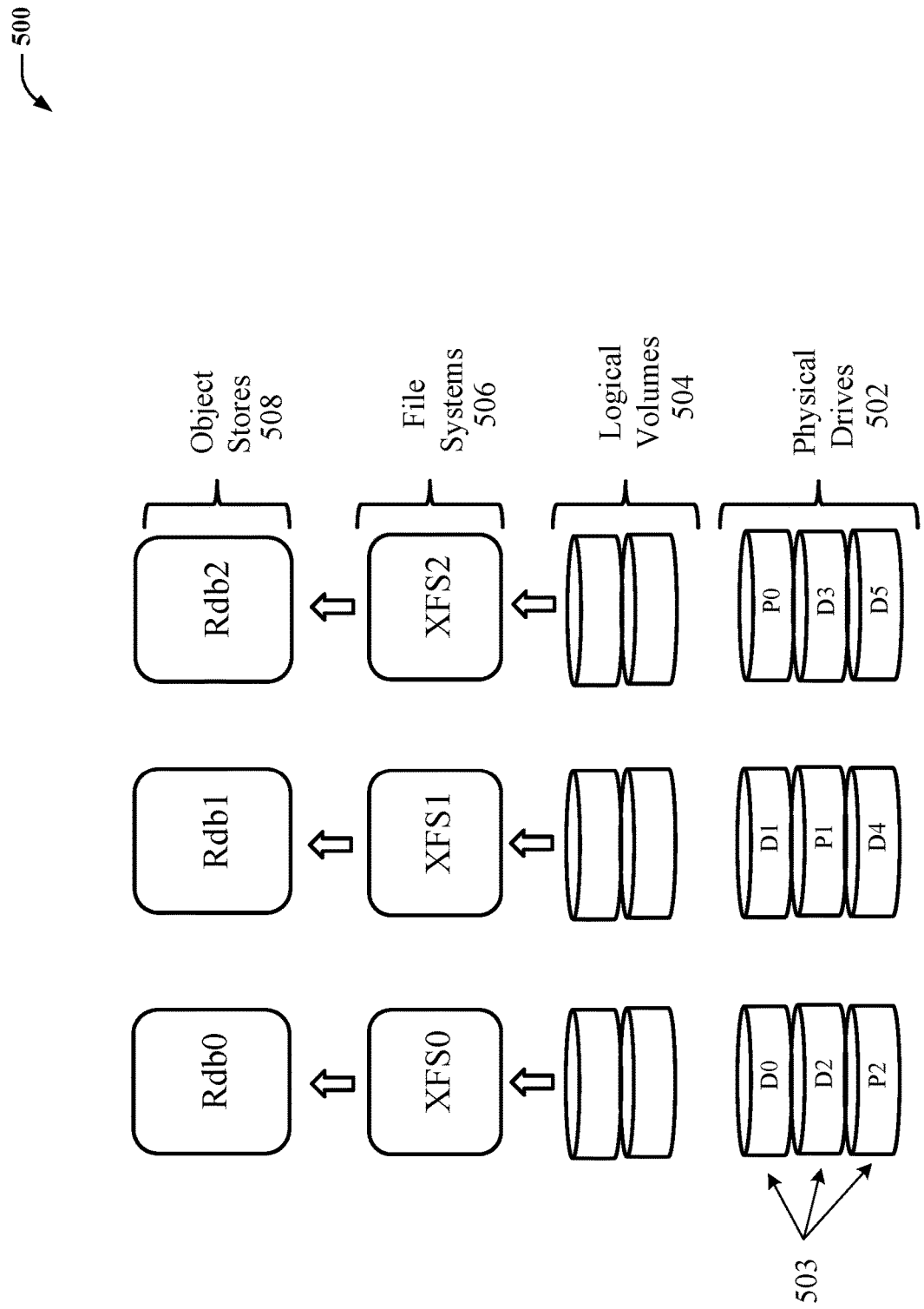
FIG. 5 depicts a block-based RAID system managed by a drive utilization system, in accordance with one or more embodiments described herein.

For example, turning briefly to FIG. 5, and also still to FIG. 4, a data storage system 500 can comprise various object stores 508 that can comprise various file systems 506. The file systems 506 can employ logical volumes 504, for which data of the logical volumes 504 can be stored at plural physical drives 502, which each can comprise plural chunks 503. For example, a first physical drive can comprise chunks D0, D2 and P2. Relative to the physical drives 502 of FIG. 5, vertical striping can comprise writing first at chunk D0, and then sequentially next at chunk D2. Traditional horizontal striping, alternatively, would comprise writing first to chunk D0 of a first physical drive, and then to chunk D1 of a second physical drive.

Still referring to FIG. 4, based on the data obtained, the control component 412 can generally direct (e.g., direct the RAID, a RAID controller, and/or the like) for n physical drives of a redundant array of disks (RAID) storing data for at least n logical volumes, log-structured writing of data of each logical volume of the at least n logical volumes vertically across chunks of only a single physical drive of the n physical drives. The n physical drives can be related in that the control component 412 can further direct writing of parity data at each of the physical drives, which parity data corresponds to each other one of the physical drives of the n physical drives.

It is understood that three different hardware embodiments develop parity data differently. If a dedicated hardware RAID controller is present, that hardware RAID controller will automatically generate the needed parity data as part of its basic operation. In the prior art, a hardware RAID controller will determine the arrangement of data on the various drives forming the RAID array. In the prior art, as explained above, that would normally be horizontal striping. If a hardware RAID controller is used in embodiments according to the present invention, the hardware RAID controller is reprogrammed to perform vertical striping of data as described herein, but still performs horizontal parity operations as normally done. When a hardware RAID controller, reprogrammed to operate as described herein, the control component 412 directs writing of parity data by controlling the hardware RAID controller to act as described here, where the actual XOR parity calculations are performed in the RAID controller hardware but at the direction of the control component 412 and the parity component 414 is the hardware RAID controller.

A second hardware embodiment does not utilize a dedicated hardware RAID controller but does include a hardware XOR engine or similar hardware to accelerate parity operations. In this second hardware embodiment, the parity component 414 manages and controls data flows with the hardware XOR engine and the control component 412 manages the parity component 414 to develop parity data as necessary, with the control component 412 directing the placement of the parity data in the proper horizontal locations of the physical drives.

A third hardware embodiment, such as present in a cloud computing environment, has no hardware XOR acceleration and all parity calculations are performed in software on the controller computer. In this third embodiment, the parity component 414 is a software component that does parity development and is managed and controlled by the control component 412. As discussed below, selected embodiments of the present invention operate to make this software parity alternative computationally feasible.

For simplicity, in the remainder of this description, the control component 412 (or its equivalent) is discussed as controlling parity operations. It is understood that the details may vary for a given hardware embodiment as discussed above.

That is, the control component 412 can direct writing of data/objects or of the data of each virtual volume to only single physical drive 150 to 156 of a RAID having the plural physical drives 150 to 156. More particularly, the control component 412 can direct vertical striping, such as directing sequential writes of data vertically across chunks of a single physical drive 150 to 156 of the RAID (e.g., the data storage system) for data of each logical volume. That is, the writing performed and/or directed (e.g., by the control component 412) can be only to respective individual physical drives absent generation of a cross-drive dependency across the plural physical drives 150 to 156 of the RAID for any one logical volume. As used herein, a "cross-drive dependency" refers to use of plural physical drives for storage of data corresponding to any one logical volume.

With respect to the writing, the tracking component 416 can direct journaling of correspondences between the logical volumes and the physical drives in log-structured format, thus accounting for the log-structured writing.

The journaling can facilitate logging of what is actually written to the physical drives and any correspondence to initial deterministic allocation via the RAID. The logged/journaled data (e.g., log-structured writes) can comprise a timestamp, logical drive starting address, size of the data, and/or the like. This feature can facilitate reduction or elimination of sacrifice of performance of the RAID and/or of write amplification, as side-effects of achieving the proportional degradation.

In one or more embodiments, the actual writing of the data to the physical drives can comprise the journaling. In one or more other embodiments, a journal 432 (e.g., listing, cache, table, matrix, and/or the like) can be separate from the actual write of the data to the physical drives. In such case, the journal 432 can be written to the same physical drive as the data which is journaled at the journal 432. In one or more other embodiments, the journal 432 can be stored separate from the physical drive having the data which is journaled at the journal 432. Indeed, in one or more embodiments, various sets of journaled data from various instances of writing can be written, logged, stored, and/or the like, at the direction of the tracking component 416 to one or more suitable locations, such as to the physical drives, memory 404, and/or any other storage external and/or internal to the drive utilization system 402.

It is noted that while vertical striping of a single physical drive will provide the desired proportional degradation, vertical striping of a single physical drive can result in increased write amplification. In RAID5 operation, if only a single drive is written in a horizontal stripe, to actually perform the write requires first reading the intended location and the associated parity location, performing an XOR of the data read from the intended location with the parity data and then XORing in the resultant data and the new data to form the new parity value and then finally writing the new data and the new parity data. In normal horizontal RAID5 operation, in many cases the data to be written is an entire horizontal stripe. In that case, no reads are required, as the data for the horizontal stripe is simply XORd together to produce the parity data. But vertical striping of a single drive as described here does not produce that natural collection of all horizontal data to obviate the need for the reads, so the vertical operation might lead to the amplification due to the necessary reading of existing data and parity data.

However, referring to FIG. 5, it is seen that there are multiple parallel logical volumes 504. If each of those logical volumes operates according to the described vertical striping, the need for the existing data and parity reads is greatly reduced. Understanding that each of the logical volumes will be operating vertically; also understanding that entire chunks are being written, rather than smaller segments; further understanding that writing the chunks to each of the physical drives will start at the same location on each physical drive, such as starting at zero as an example; even more understanding that all write operations are actually buffered in practice, either as a buffer or as a write cache, so that a number of chunks will be waiting in buffers to be written; and even further understanding that when configured so that the logical volumes have approximately the same amount of data being written to each logical volume, then the writing of the chunks to each of the physical drives will occur in parallel to the same locations on each of the physical drives for a longer period of time. Chunk 1 will be written to each drive at the same time, chunk 2 will be written to each drive at the same time, chunk 3 will be written to each drive at the same time, and so on. Because data being written to the same locations on each drive will be present in the buffers or cache at the same time, parity for those locations can be directly developed by XORing the data of each drive from the buffers or cache. This parallel operation of sequentially writing chunks of data from each logical volume to the related physical drive removes the concerns about write amplification of the vertical striping by enabling the equivalent of full horizontal stripe operation of the prior art.

It is also noted that writing to parallel locations of the logical volumes is not required, just writing to the logical volumes at essentially equal rates. This is because the location of the intended write in the logical volume is not relevant as the journaling and log-structured writing to the physical drives decouples the location in the logical volume from the location in the physical drive.

While this parallel operation of the logical volumes will happen for a great majority of write operations in a properly configured system, occasionally the full parallel operation will not be possible and less than full horizontal stripe operations will have to occur to avoid buffer timeouts and the like. However, this is expected at an infrequent rate. Further, when such a condition happens, when sufficient data from each logical volume is again available, parallel operation can be resumed by simply skipping the chunks on any drives not written, so that parallel chunks are again being written. These skipped chunks can be used or recaptured when non-parallel operation is performed.

As much of the time direct parity generation will be performed from the parallel data streams, in some embodiments the parity generation can be performed in software, without any hardware acceleration. Modern processors can perform the needed XOR operations at great speed if the needed data is available. As modern processors often have multiple cores, one of those cores can be dedicated to the parity process. The infrequent nature of the non-parallel operation will be such that even doing those non-parallel operations in software, the overall performance of the parity generation in software will be satisfactory and the cost savings of not needing the XOR hardware acceleration will offset any slightly reduced performance. Additionally, as all parity operations are now being done in software, such an embodiment is well suited for operating in a cloud computing environment. This greatly reduces the cost of the physical computer and allows great flexibility in the number of controllers and the like deployed in a given installation.

For example, looking again to FIG. 5, creating a new file on Rdb0 SFS object store 508 can result in writes to addresses 0x1000 (e.g., 512 bytes), 0x45440800 (e.g., 4K), and 0x80800400 (e.g., 64M), relative to the respective logical volume 504. These writes can be journaled in chunk D0 as:

D0 Offset: 0; Record: 1,0x100,512,<512 bytes of data>
D0 Offset: 536; Record: 2,0x45440800,4K,<4K bytes of data>
D0 Offset: 4656; Record: 3,0x80800400,64M,<64M bytes of data>.

Simultaneously, and/or otherwise in conjunction therewith, chunk D1 can be populated with log entries associated with the Rdb1 XFS. Simultaneously, and/or otherwise in conjunction therewith, drive P0 can be populated with error correction data relative to the individually, sequentially written chunks D1 and D0.

Figure 11:
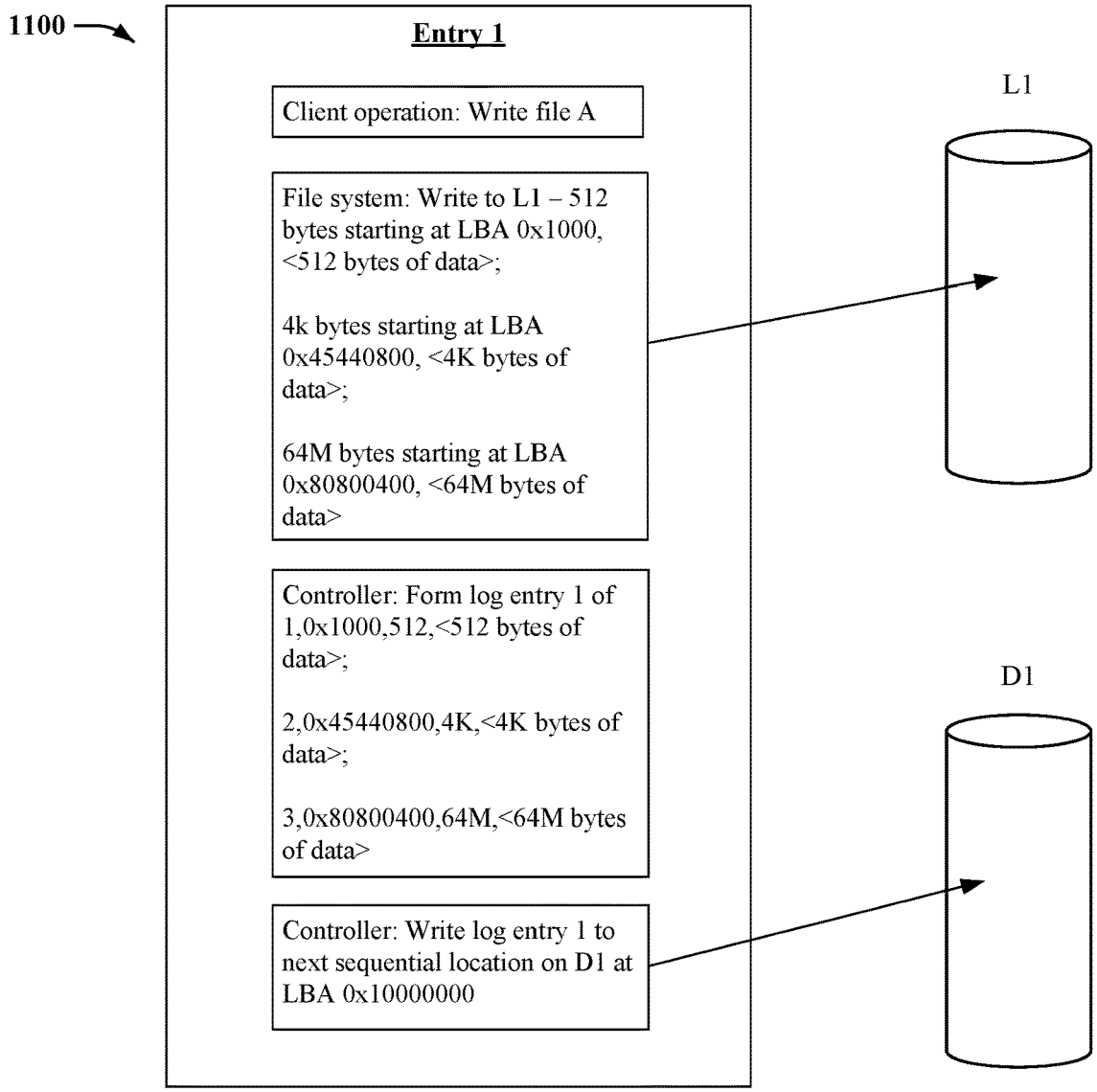
FIG. 11 illustrates a portion of a remapping operation between write operations to a logical volume and write operations to a physical drive.
Figure 12:
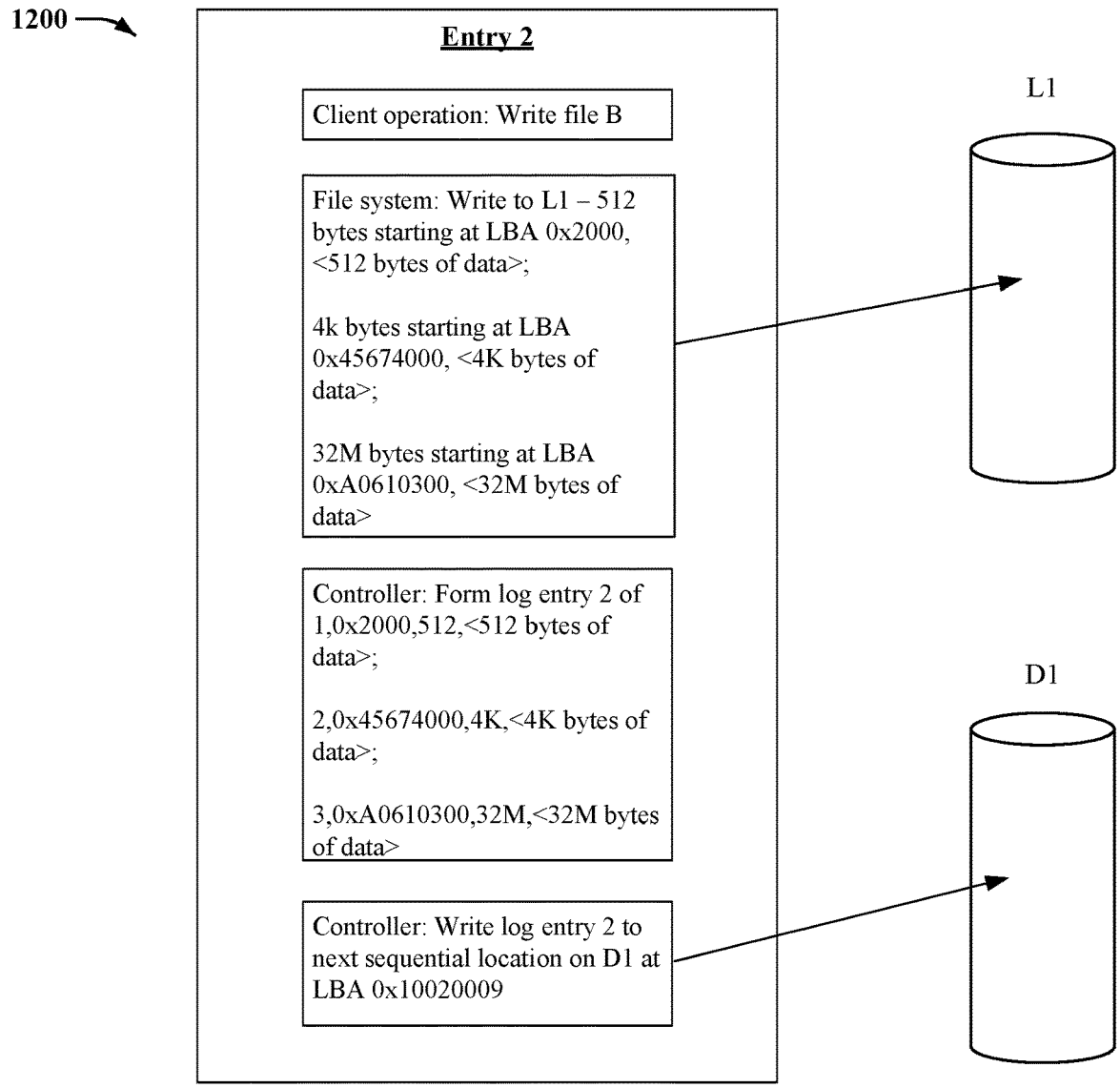
FIG. 12 illustrates another portion of the remapping operation of FIG. 11 between write operations to a logical volume and write operations to a physical drive.
Figure 13:
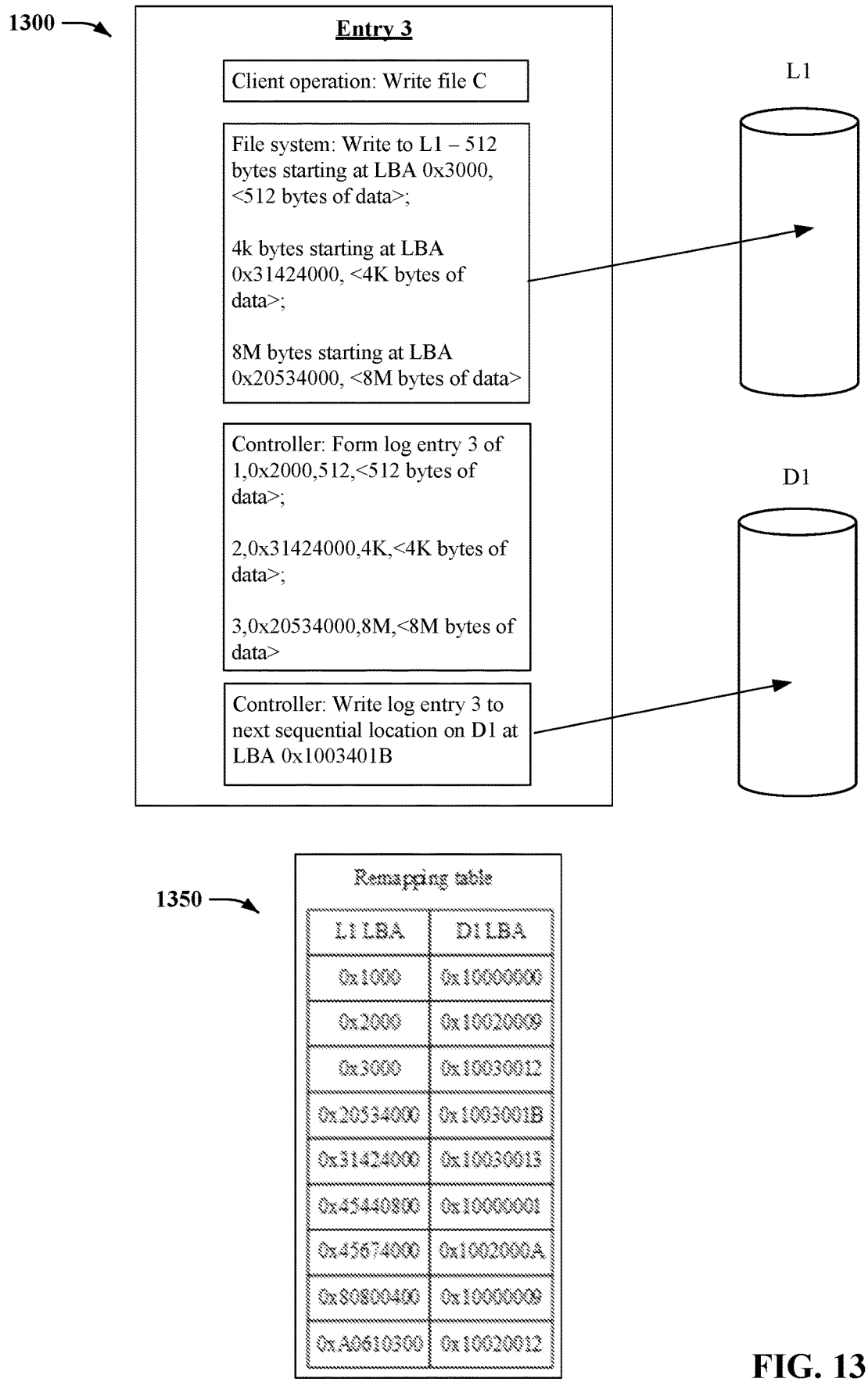
FIG. 13 illustrates another portion of the remapping operation of FIGS. 11 and 12 between write operations to a logical volume and write operations to a physical drive.

Next, based on the log-structured writing, such as performed by the control component 412 and/or a respective RAID engine, for example, the generation component 418 can generate a remapping table for use in reads of data at the physical drives. Such remapping table can comprise correspondences between addresses of the logical volumes and addresses of the physical drives based on the log-structured writing of the data directed by the control component 412. This is illustrated in FIGS. 11 to 13. Three client write operations are illustrated of files A, B and C. Three actual write operations are generated to the logical volume L1 for each file write. Those sets of three write operations produce three journal entries:

Entry 1 (1100, FIG. 11)
D1 Offset:0; Record: 1,0x1000,512,<512 bytes of data>
D1 Offset:512; Record: 2,0x45440800,4K,<4K bytes of data>
D1 Offset:4608; Record: 3,0x80800400,64M,<64M bytes of data>

Entry 2 (1200, FIG. 12)
D1 Offset:0; Record: 1,0x2000,512,<512 bytes of data>
D1 Offset:512; Record: 2,0x45674000,4K,<4K bytes of data>

D1 Offset:4608; Record: 3,0xA0610300,32M,<32M bytes of data>

Entry 3 (1300, FIG. 13)
D1 Offset:0; Record: 1,0x2000,512,<512 bytes of data>
D1 Offset:512; Record: 2,0x31424000,4K,<4K bytes of data>
D1 Offset:4608; Record: 3,0x20534000,8M,<8M bytes of data>

The three journal entries are written to physical drive D1 starting at LBA 0x10000000. The resulting remapping table 1350 (FIG. 13) is:

| Logical volume L1 LBA | Physical drive D1 LBA |
| --- | --- |
| 0x1000 | 0x10000000 |
| 0x2000 | 0x10020009 |
| 0x3000 | 0x10030012 |
| 0x20534000 | 0x1003001B |
| 0x31424000 | 0x10030013 |
| 0x45440800 | 0x10000001 |
| 0x45674000 | 0x1002000A |
| 0x80800400 | 0x10000009 |
| 0xA0610300 | 0x10020012 |

When a client requests a copy of file B, read requests for the related three logical volume L1 locations are requested. Those locations are used as search values in the remapping table, with the returned values being the three relevant locations on physical drive D1 indicated in the remapping table. The controller places read requests for those three locations on physical drive D1 and returns the data to the file system for return to the requesting client. If the controller crashes or otherwise loses power, the remapping table is lost, as the remapping table is maintained in memory. The remapping table is readily rebuilt on startup of the controller by reading the physical drive D1. Each log entry on the physical drive P1 includes a copy of the journal entries, without the data. Knowing the location on physical drive D1 of the journal entry that has just been read, using that location value and the contents of the journal entry allows the remapping table entries for the log entry on physical drive D1 to be rebuilt. After the entire physical drive D1 has been read, the remapping table is completely rebuilt.

Next, the parity component 414, for example absent a RAID controller, can calculate error correction horizontally across chunks of the physical drives of the RAID, such as in the case of reconstruction of data of one or more physical drives due to one or more physical drive failures. As used herein, error correction can refer to parity and/or other mathematical transformations employed to facilitate error correction, such as recovery of data. Generally, parity can be employed to determine a number of odd and even bits in a number, which information can be employed to reconstruct data if a sequence of numbers is lost, such as due to a drive failure.

As indicated above relative to FIG. 5, the error correction data (e.g., parity data) directed and/or written by the control component 412 can be horizontally corresponding (e.g., horizontally striped), while the writing of sequential writes directed and/or written by the control component 412 can be vertically corresponding (e.g., vertically striped).

Turning next to addressing physical drive failure by the drive utilization system 402, the control component 412 can perform one or more processes. For example, upon failure of a single physical drive of the n physical drives, the control component 412 can direct rewriting/reconstruction at a rectified version of the single physical drive from the data, including the parity data, of the other physical drives of the n physical drives.

In another example, upon parallel failures of multiple physical drives of the n physical drives, the control component 412 can direct an amount of reading from physical drives other than the n physical drives and rewriting at rectified versions of the multiple physical drives, which reading and writing is proportional to the number of the multiple physical drives. And different from conventional frameworks, upon parallel failures of multiple physical drives of the n physical drives, data of complete logical volumes corresponding to non-failed physical drives of the n physical drives can remain accessible.

Figure 8:
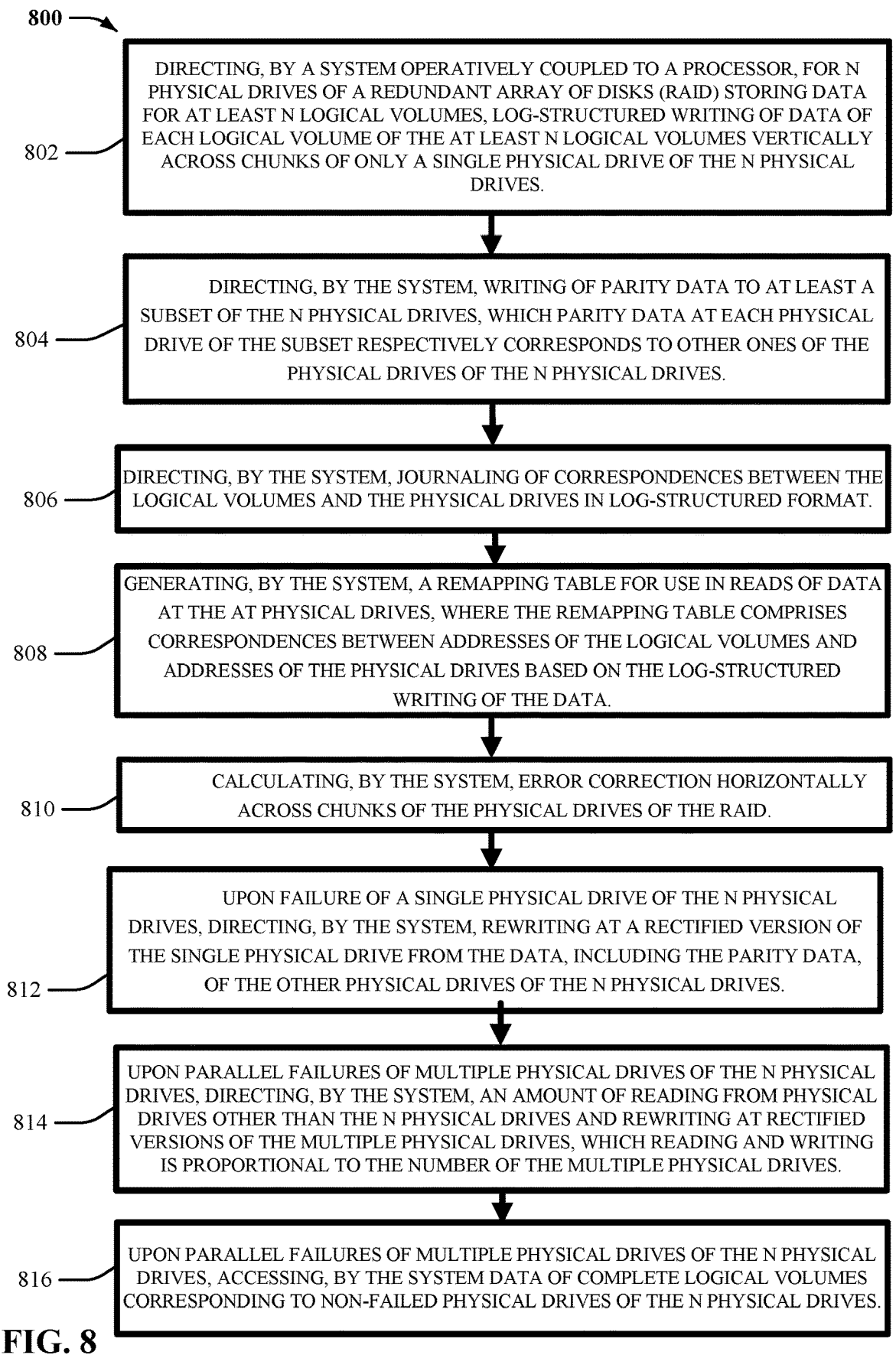
FIG. 8 illustrates a process flow for facilitating management of a RAID system, in accordance with one or more embodiments described herein.

Next, FIG. 8 illustrates a flow diagram of an example, non-limiting method 800 that can facilitate a process to write data to a redundant array of disks, in accordance with one or more embodiments described herein, such as the non-limiting system 400 of FIG. 4. While the non-limiting method 800 is described relative to the non-limiting system 400 of FIG. 4, the non-limiting method 800 can be applicable also to other systems described herein, such as the non-limiting system 300 of FIG. 3. Repetitive description of like elements and/or processes employed in respective embodiments is omitted for the sake of brevity.

At 802, the non-limiting method 800 can comprise directing, by a system operatively coupled to a processor (e.g., control component 412), for n physical drives of a redundant array of disks (RAID) storing data for at least n logical volumes, log-structured writing of data of each logical volume of the at least n logical volumes vertically across chunks of only a single physical drive of the n physical drives.

At 804, the non-limiting method 800 can comprise directing, by the system (e.g., control component 412), writing of parity data to at least a subset of the n physical drives, which parity data at each physical drive of the subset respectively corresponds to other ones of the physical drives of the n physical drives (e.g., other than the physical drive at which the parity data is written).

At 806, the non-limiting method 800 can comprise directing, by the system (e.g., tracking component 416), journaling of correspondences between the logical volumes and the physical drives in log-structured format.

At 808, the non-limiting method 800 can comprise generating, by the system (e.g., generation component 418), a remapping table for use in reads of data at the physical drives, where the remapping table comprises correspondences between addresses of the logical volumes and addresses of the physical drives based on the log-structured writing of the data.

At 810, the non-limiting method 800 can comprise calculating, by the system (e.g., parity component 414), error correction horizontally across chunks of the physical drives of the RAID.

At 812, the non-limiting method 800 can comprise, upon failure of a single physical drive of the n physical drives, directing, by the system (e.g., control component 412), rewriting at a rectified version of the single physical drive from the data, including the parity data, of the other physical drives of the n physical drives.

At 814, the non-limiting method 800 can comprise, upon parallel failures of multiple physical drives of the n physical drives, directing, by the system (e.g., control component 412), an amount of reading from physical drives other than the n physical drives and rewriting at rectified versions of the multiple physical drives, which reading and writing is proportional to the number of the multiple physical drives.

At 816, the non-limiting method 800 can comprise, upon parallel failures of multiple physical drives of the n physical drives, accessing, by the system (e.g., processor 406) data of complete logical volumes corresponding to non-failed physical drives of the n physical drives.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products, and/or computer-implemented methods are provided herein to use a redundant array of disks. A system can comprise a memory that stores computer executable components, and a processor that executes the computer executable components stored in the memory, wherein the computer executable components can comprise a control component that directs, for n physical drives of a redundant array of disks (RAID) storing data for at least n logical volumes, log-structured writing of data of each logical volume of the at least n logical volumes vertically across chunks of only a single physical drive of the n physical drives, wherein the control component further directs writing of parity data at each of the physical drives, which parity data at each physical drive of the subset respectively corresponds to other ones of the physical drives of the n physical drives.

An advantage of the aforementioned systems, devices, computer program products and/or computer-implemented methods can be an ability to reduce computing power, processing power, short-term memory usage, bandwidth issues, manual labor, downtime, financial loss, and/or the like associated with a multiple drive failure of a RAID system assisted by the one or more systems, devices, computer program products and/or computer-implemented methods described herein. As an element of a multi-level data protection scheme, the one or more systems, devices, computer program products and/or computer-implemented methods described herein can provide for data storage without sacrificing excessive storage to minimize the probability of a whole RAID failure.

Another advantage can be increase of available storage space and efficiency of a RAID system assisted by the one or more systems, devices, computer program products, and/or computer-implemented methods described herein. That is, as compared to existing control frameworks, a RAID system assisted by the one or more systems, devices, computer program products and/or computer-implemented methods described herein can employ less space as backup to account for drive failure, and further can more efficient distribution of access to a node, use of system bandwidth, use of short-term memory and/or the like. In combination, these advantages can provide a fast and efficient data recall/read/retrieval system for a user entity.

Indeed, in view of the one or more embodiments described herein, a practical application of the systems, computer-implemented methods, and/or computer program products described herein can be the increase in available storage space, reduction in down time due to drive failure, and reduction in non-usable partial data in the event of a multi-drive failure of a RAID system, as compared to conventional RAID systems or RAID control systems. Overall, such computerized tools can constitute a concrete and tangible technical improvement in the field of RAID systems or RAID control/management systems, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to use of a redundant array of independent disks (RAID) system, as compared to existing systems and/or techniques lacking such approach (es). Systems, computer-implemented methods, and/or computer program products facilitating performance of these processes are of great utility in the field of RAID systems and RAID management systems and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically manage virtual and physical volumes of a RAID system, as the one or more embodiments described herein can facilitate this process. And, neither can the human mind nor a human with pen and paper effectively, electronically manage virtual and physical volumes of a RAID system, as conducted by one or more embodiments described herein.

One or more embodiments described herein can be fully operational towards performing one or more other functions (e.g., fully powered on, fully executed and/or another function) while also performing one or more of the one or more operations described herein.

Figure 9:
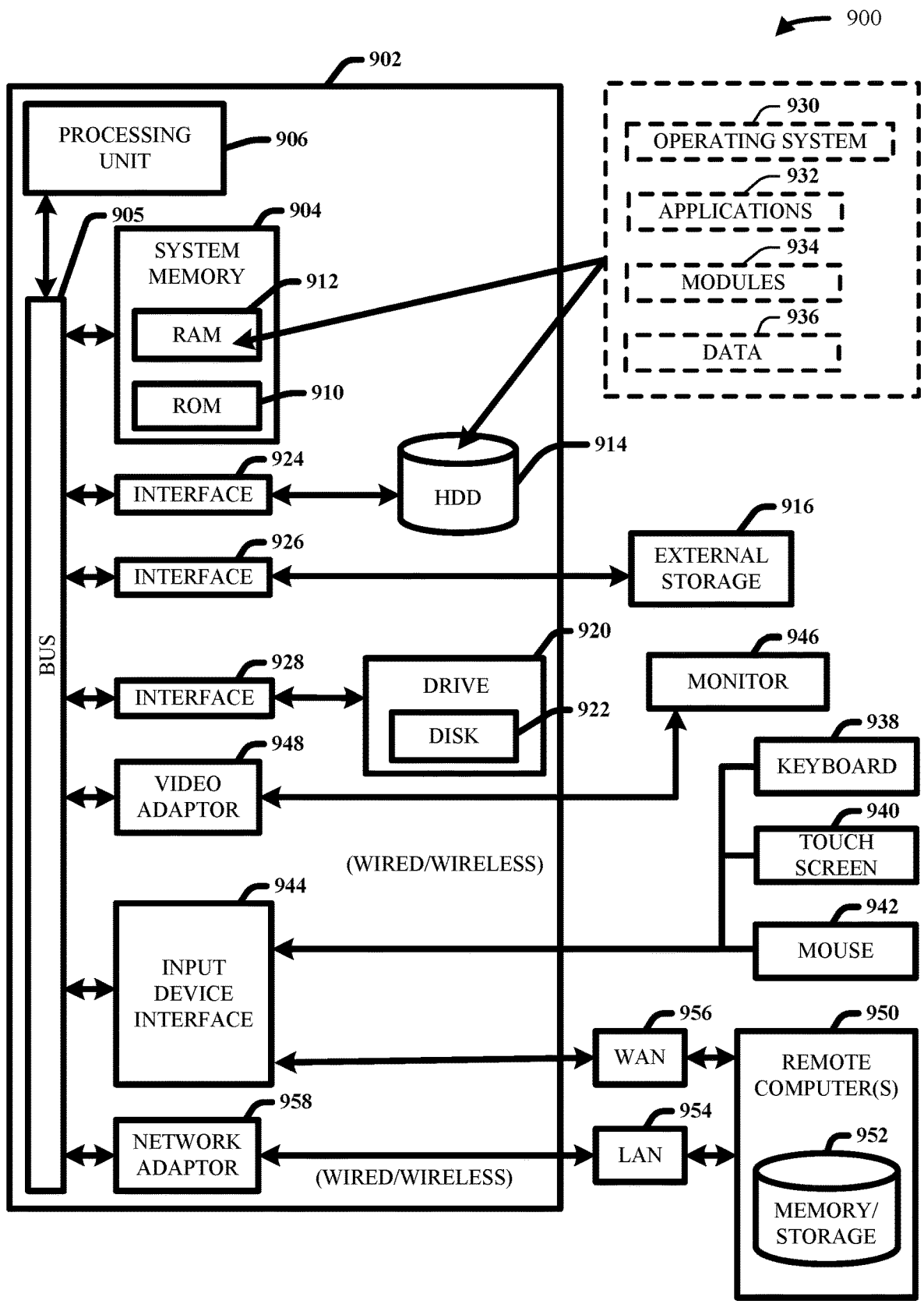
FIG. 9 illustrates a block diagram of an example, non-limiting, operating environment in which one or more embodiments described herein can be facilitated.
Figure 10:
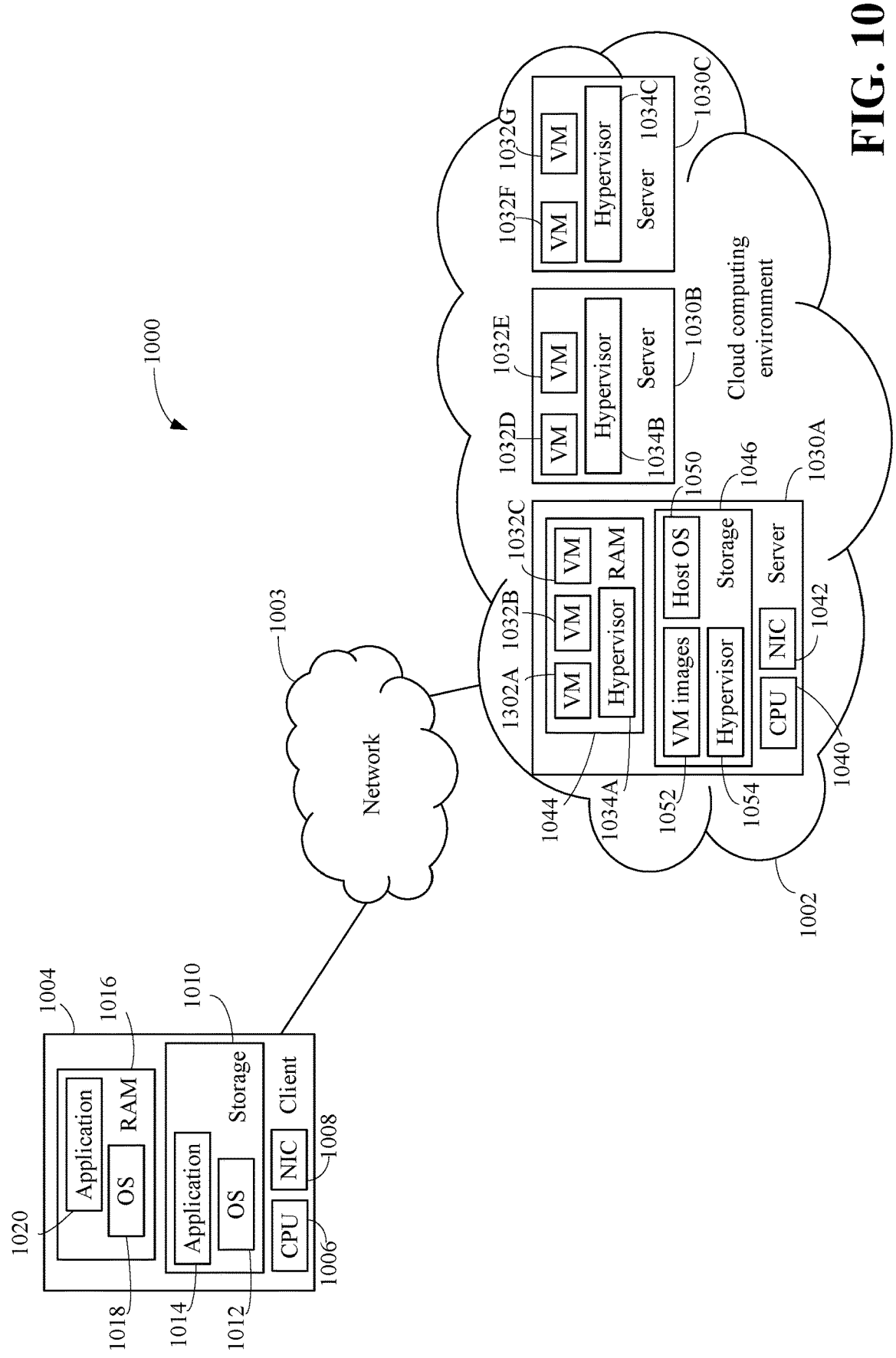
FIG. 10 illustrates a block diagram of an example, non-limiting, cloud computing environment in accordance with one or more embodiments described herein.

Turning next to FIGS. 9 and 10, a detailed description is provided of additional context for the one or more embodiments described herein at FIGS. 1-8.

FIG. 9 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, distributed computing systems, as well as personal computers, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 9, the example operating environment 900 for implementing one or more embodiments of the aspects described herein can include a computer 902, the computer 902 including a processing unit 906, a system memory 904 and/or a system bus 905. One or more aspects of the processing unit 906 can be applied to processors such as 306 and/or 406 of the non-limiting systems 300 and/or 400. The processing unit 906 can be implemented in combination with and/or alternatively to processors such as 306 and/or 406.

Memory 904 can store one or more computer and/or machine readable, writable and/or executable components and/or instructions that, when executed by processing unit 906 (e.g., a classical processor, and/or like processor), can facilitate performance of operations defined by the executable component(s) and/or instruction(s). For example, memory 904 can store computer and/or machine readable, writable, and/or executable components and/or instructions that, when executed by processing unit 906, can facilitate execution of the one or more functions described herein relating to non-limiting system 300 and/or non-limiting system 400, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 906 can comprise one or more types of processors and/or electronic circuitry (e.g., a classical processor and/or like processor) that can implement one or more computer and/or machine readable, writable and/or executable components and/or instructions that can be stored at memory 904. For example, processing unit 906 can perform one or more operations that can be specified by computer and/or machine readable, writable, and/or executable components and/or instructions including, but not limited to, logic, control, input/output (I/O), arithmetic, and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, and/or another type of processor. The examples of processing unit 906 can be employed to implement one or more embodiments described herein.

The system bus 905 can couple system components including, but not limited to, the system memory 904 to the processing unit 906. The system bus 905 can comprise one or more types of bus structure that can further interconnect to a memory bus (with or without a memory controller), a peripheral bus, and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., SATA, SAS), one or more external storage devices 916 (e.g., a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally, and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 905 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules, and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise the operating system of a virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 905, but can be connected by other interfaces, such as a parallel port, an IEEE 1394 serial port, a game port, a USB port, an IR interface, a BLUETOOTH® interface, and/or the like.

A monitor 946 or other type of display device can be alternatively and/or additionally connected to the system bus 905 via an interface, such as a video adapter 948. In addition to the monitor 946, a computer typically includes other peripheral output devices (not shown), such as speakers, printers, and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively, optically and/or the like) to one or more external systems, sources, and/or devices (e.g., computing devices, communication devices and/or like device) via a data cable.

In one or more embodiments, a network can comprise one or more wired and/or wireless networks, including, but not limited to, a cellular network, a wide area network (WAN) (e.g., the Internet), a local area network (LAN) or a wireless LAN (WLAN).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. In a networked environment, program modules depicted relative to the computer 902 or portions thereof can be stored in the remote memory/storage device 952. The network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958. Upon connecting the computer 902 to an associated cloud storage system, the external storage interface 926 can, such as with the aid of the adapter 958, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100, 200, 300, and/or 400, and/or the example operating environment 900 of FIG. 9, can be associated with and/or be included in cloud-based and/or partially-cloud-based system.

Referring now to details of one or more elements illustrated at FIG. 10, the illustrative cloud computing environment 1002 is depicted. Cloud computing environment 1002 can comprise one or more cloud computing nodes, virtual machines, and/or the like with which are used by clients 1004, such as the computer 902. The client 1004 (e.g., client entity) has a processor 1006, network interface card (NIC) 1008, storage 1010 which holds the operating system 1012 and any applications 1014, and RAM 1016 which stores the executing operating system 1018 and applications 1020. The client 1004 is connected to the cloud computing environment 1002 by a network 1003, such as the Internet.

The cloud computing environment 1002 is illustrated as having three servers 1030A, 1030B and 1030C. Each server 1030A-1030 includes three virtual machines 1032, with server 1030A including VMs 1032A-1032C, server 1030B including VMs 1032D-1032E and server 1030C including VMs 1032F-1032G; and a hypervisor 1034A-1034C. More detail is provided of server 1030A as exemplary of the servers 1030B and 1030C. The server 1030A includes a processing unit 1040, a NIC 1042, RAM 1044 and non-transitory storage 1046. The RAM 1044 includes the operating virtual machines 1032A-1032C and the operating hypervisor 1034A. The non-transitory storage 1046 includes stored versions of the host operating system 1050, the virtual machine images 1052 and the stored version of the hypervisor 1054. The servers 1030, 1030B and 1030C are connected by a network in the cloud computing environment 1002 to allow access to the network 1003 and the client 1004.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    a memory that stores computer executable components; and
    a processor that executes the computer executable components stored in the memory, wherein the computer executable components comprise:
        a control component that directs, for n physical drives of a redundant array of disks (RAID) that provide storage for at least n logical volumes, log-structured writing of data of logical volumes of the at least n logical volumes vertically across chunks of individual physical drives of the n physical drives,
        wherein the control component further directs writing of parity data to at least a subset of the n physical drives,
        wherein parity data at the individual physical drives of the subset respectively corresponds to the data of one or more other physical drives of the n physical drives, and
    wherein upon parallel failures of multiple physical drives of the n physical drives, data of complete logical volumes corresponding to non-failed physical drives of the n physical drives remains accessible.

2. The system of claim 1, further comprising:
    a tracking component that directs journaling of correspondences between the logical volumes and the physical drives in log-structured format.

3. The system of claim 1, further comprising:
    a generation component that generates a remapping table for use in reads of data at the physical drives,
    wherein the remapping table comprises correspondences between addresses of the logical volumes and addresses of the physical drives based on the log-structured writing of the data.

4. The system of claim 1, further comprising:
    a parity component that calculates error correction horizontally across chunks of the physical drives of the RAID.

5. The system of claim 1, wherein upon failure of a single physical drive of the n physical drives, the control component directs rewriting at a rectified version of the single physical drive from the data, including the parity data, of the other physical drives of the n physical drives.

6. The system of claim 1, wherein upon the parallel failures of the multiple physical drives of the n physical drives, the control component directs reading from physical drives of the n physical drives, other than the multiple physical drives of the n physical drives, and rewriting at rectified versions of the multiple physical drives, which reading and rewriting are proportional to the number of the multiple physical drives.

7. The system of claim 1, wherein the control component further directs the writing of the parity data to at least the subset of the n physical drives, and
    wherein parity data corresponding to at least a first of the physical drives of the n physical drives is directed to be written at a plurality of the physical drives of the subset of the n physical drives.

8. A computer-implemented method, comprising:
    directing, by a system operatively coupled to a processor, for n physical drives of a redundant array of disks (RAID) that provide storage for at least n logical volumes, log-structured writing of data of logical volumes of the at least n logical volumes vertically across chunks of individual physical drives of the n physical drives;
    directing, by the system, writing of parity data to at least a subset of the n physical drives, which parity data at the individual physical drives of the subset respectively corresponds to the data of one or more other physical drives of the n physical drives; and
    upon parallel failures of multiple physical drives of the n physical drives:
        directing, by the system, reading from physical drives of the n physical drives, other than the multiple physical drives of the n physical drives; and
        rewriting, by the system, data based on the reading at rectified versions of the multiple physical drives, which reading and rewriting are proportional to the number of the multiple physical drives.

9. The computer-implemented method of claim 8, further comprising:
    directing, by the system, journaling of correspondences between the logical volumes and the physical drives in log-structured format.

10. The computer-implemented method of claim 8, further comprising:
    generating, by the system, a remapping table for use in reads of data at the physical drives,
    wherein the remapping table comprises correspondences between addresses of the logical volumes and addresses of the physical drives based on the log-structured writing of the data.

11. The computer-implemented method of claim 8, further comprising:
    calculating, by the system, error correction horizontally across chunks of the physical drives of the RAID.

12. The computer-implemented method of claim 8, further comprising:
    upon failure of a single physical drive of the n physical drives, directing, by the system, rewriting at a rectified version of the single physical drive from the data, including the parity data, of the other physical drives of the n physical drives.

13. The computer-implemented method of claim 8, wherein upon the parallel failures of the multiple physical drives of the n physical drives, data of complete logical volumes corresponding to non-failed physical drives of the n physical drives remains accessible.

14. The computer-implemented method of claim 8, wherein the directing of the writing of the parity data further comprises directing, by the system, the writing of first parity data corresponding to at least a first of the physical drives of the n physical drives to a plurality of the physical drives of the subset of the n physical drives.

15. A computer program product facilitating use of a redundant array of disks, the computer program product comprising a non-transitory computer readable storage medium having program instructions embodied therewith, the program instructions executable by a processor to cause the processor to perform operations comprising:
   directing, by the processor, for n physical drives of a redundant array of disks (RAID) that provide storage for at least n logical volumes, log-structured writing of data of logical volumes of the at least n logical volumes vertically across chunks of individual physical drives of the n physical drives; and
   directing, by the processor, writing of parity data to at least a subset of the n physical drives, which parity data at the individual physical drives of the subset respectively corresponds to the data of one or more other physical drives of the n physical drives,
   wherein upon parallel failures of multiple physical drives of the n physical drives, data of complete logical volumes corresponding to non-failed physical drives of the n physical drives remains accessible.

16. The computer program product of claim 15, wherein the operations further comprise:
   directing, by the processor, journaling of correspondences between the logical volumes and the physical drives in log-structured format.

17. The computer program product of claim 15, wherein the operations further comprise:
   generating, by the processor, a remapping table for use in reads of data at the physical drives,
   wherein the remapping table comprises correspondences between addresses of the logical volumes and addresses of the physical drives based on the log-structured writing of the data.

18. The computer program product of claim 15, wherein the operations further comprise:
   calculating, by the processor, error correction horizontally across chunks of the physical drives of the RAID.

19. The computer program product of claim 15, wherein the operations further comprise:
   upon the parallel failures of the multiple physical drives of the n physical drives, directing, by the processor, reading from physical drives of the n physical drives, other than the multiple physical drives of the n physical drives, and rewriting at rectified versions of the multiple physical drives, which reading and rewriting are proportional to the number of the multiple physical drives.

20. The computer program product of claim 15, wherein the directing of the writing of the parity data further comprises directing, by the processor, the writing of first parity data corresponding to at least a first of the physical drives of the n physical drives to a plurality of the physical drives of the subset of the n physical drives.

21. A system, comprising:
   a memory that stores computer executable components; and
   a processor that executes the computer executable components stored in the memory, wherein the computer executable components comprise:
      a control component that directs, for n physical drives of a redundant array of disks (RAID) that provide storage for at least n logical volumes, log-structured writing of data of logical volumes of the at least n logical volumes vertically across chunks of individual physical drives of the n physical drives,
      wherein the control component further directs writing of parity data to at least a subset of the n physical drives, which parity data at the individual physical drives of the subset respectively corresponds to the data of one or more other physical drives of the n physical drives, and
      wherein upon parallel failures of multiple physical drives of the n physical drives, the control component directs reading from physical drives of the n physical drives, other than the multiple physical drives of the n physical drives, and rewriting at rectified versions of the multiple physical drives, which reading and rewriting are proportional to the number of the multiple physical drives.

22. A computer-implemented method, comprising:
   directing, by a system operatively coupled to a processor, for n physical drives of a redundant array of disks (RAID) that provide storage for at least n logical volumes, log-structured writing of data of logical volumes of the at least n logical volumes vertically across chunks of individual physical drives of the n physical drives; and
   directing, by the system, writing of parity data to at least a subset of the n physical drives, which parity data at the individual physical drives of the subset respectively corresponds to the data of one or more other physical drives of the n physical drives,
   wherein upon parallel failures of multiple physical drives of the n physical drives, data of complete logical volumes corresponding to non-failed physical drives of the n physical drives remains accessible.

23. A computer program product facilitating use of a redundant array of disks, the computer program product comprising a non-transitory computer readable storage medium having program instructions embodied therewith, the program instructions executable by a processor to cause the processor to perform operations comprising:
   directing, by the processor, for n physical drives of a redundant array of disks (RAID) that provide storage for at least n logical volumes, log-structured writing of data of logical volumes of the at least n logical volumes vertically across chunks of individual physical drives of the n physical drives;
   directing, by the processor, writing of parity data to at least a subset of the n physical drives, which parity data at the individual physical drives of the subset respectively corresponds to the data of one or more other physical drives of the n physical drives; and
   upon parallel failures of multiple physical drives of the n physical drives, directing, by the processor, reading from physical drives of the n physical drives, other than the multiple physical drives of the n physical drives, and rewriting at rectified versions of the multiple physical drives, which reading and rewriting are proportional to the number of the multiple physical drives.

\* \* \* \* \*